US012793210B2

(12) United States Patent
Zhang et al.

(10) Patent No.: US 12,793,210 B2
(45) Date of Patent: Nov. 10, 2026

(54) COMPUTER-IMPLEMENTED METHOD, METHOD OF TRAINING DEEP LEARNING MODEL, ELECTRONIC DEVICE, AND MEDIUM

(71) Applicant: BOE TECHNOLOGY GROUP CO., LTD., Beijing (CN)

(72) Inventors: Cuifang Zhang, Beijing (CN); Zhenzhong Zhang, Beijing (CN); Yulan Hu, Beijing (CN); Shuobin Liang, Beijing (CN); Xiaotian Jiang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 395 days.

(21) Appl. No.: 18/261,462

(22) PCT Filed: Aug. 26, 2022

(86) PCT No.: PCT/CN2022/115134

§ 371 (c)(1),
(2) Date: Jul. 13, 2023

(87) PCT Pub. No.: WO2024/040576

PCT Pub. Date: Feb. 29, 2024

(65) Prior Publication Data

US 2024/0394871 A1 Nov. 28, 2024

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/174* (2017.01); *G06V 10/26* (2022.01);
(Continued)

(58) Field of Classification Search
CPC ......... G06T 7/0012; G06T 7/11; G06T 7/174; G06T 2207/20081; G06T 2207/20084;
(Continued)

(56) References Cited

U.S. PATENT DOCUMENTS

2014/0270446 A1 9/2014 Vija
2021/0166395 A1* 6/2021 Chen ......................... G06T 7/11
(Continued)

FOREIGN PATENT DOCUMENTS

CN 106636435 A 5/2017
CN 108073930 A 5/2018
(Continued)

OTHER PUBLICATIONS

Fei Dong et al., Chapter 5:Ph.D. dissertation, Zhejiang University, Ch. 5, Prediction of 1p/19q association deletion in lower grade glioma by deep Convolutional neural networks combined with manual analysis, Mar. 15, 2020, p. 36-48.
(Continued)

*Primary Examiner* — Matthew C Bella
*Assistant Examiner* — Jinsu Hwang
(74) *Attorney, Agent, or Firm* — Kinney & Lange, P.A.

(57) ABSTRACT a computer-implemented method, a method of training a deep learning model, an electronic device, and a medium are provided. The method includes: obtaining a target image segmentation result according to a target medical image of a target part, wherein the target medical image includes a medical image in at least one modality; obtaining target fusion data according to the target medical image segmentation result and a medical image in a predetermined modality in the target medical image; and obtaining a target multi-mutation detection result according to the target fusion data.

20 Claims, 15 Drawing Sheets

(51) Int. Cl.

| | |
|---|---|
| ***G06T 7/174*** | (2017.01) |
| ***G06V 10/26*** | (2022.01) |
| ***G06V 10/77*** | (2022.01) |
| ***G06V 10/774*** | (2022.01) |
| ***G06V 10/80*** | (2022.01) |

(52) U.S. Cl.
CPC ........ *G06V 10/7715* (2022.01); *G06V 10/774* (2022.01); *G06V 10/806* (2022.01); *G06T 2207/20081* (2013.01); *G06T 2207/20084* (2013.01); *G06T 2207/30096* (2013.01); *G06V 2201/03* (2022.01)

(58) Field of Classification Search
CPC ........ G06T 2207/30096; G06V 10/806; G06V 10/7715; G06V 10/26; G06V 10/774; G06V 2201/03
See application file for complete search history.

(56) References Cited

U.S. PATENT DOCUMENTS

| | | | | |
|---|---|---|---|---|
| 2021/0248736 | A1* | 8/2021 | Kamen | G06T 7/0012 |
| 2022/0022818 | A1 | 1/2022 | Ghesu et al. | |

FOREIGN PATENT DOCUMENTS

| | | | |
|---|---|---|---|
| CN | 108986067 | A | 12/2018 |
| CN | 110097921 | A | 8/2019 |
| CN | 110941700 | A | 3/2020 |
| CN | 111242959 | A | 6/2020 |
| CN | 111862066 | A | 10/2020 |
| CN | 112017259 | A | 12/2020 |
| CN | 112215826 | A | 1/2021 |
| CN | 112365980 | A | 2/2021 |
| CN | 113223014 | A | 8/2021 |
| CN | 113362325 | A | 9/2021 |
| CN | 113538305 | A | 10/2021 |
| CN | 113627422 | A | 11/2021 |
| CN | 113674229 | A | 11/2021 |
| CN | 113706441 | A | 11/2021 |
| CN | 113951830 | A | 1/2022 |
| WO | 2021121126 | A1 | 6/2021 |

OTHER PUBLICATIONS

International Search Report and Written Opinion dated Dec. 30, 2022, for corresponding PCT Application No. PCT/CN2022/115134.

Jia Wang, et al., Research Progress of MRI image genomics of glioma, Magnetic Resonance Imaging, , Oct. 31, 2018, vol. 9, No. 10.

Jiaohua Huo et al., China Excellent Master's dissertation full-text database of Medical and health Science and Technology series, Chapter 4: Prediction of brain glioma genotypes based on deep learning, Jun. 30, 2021, p. 43-57.

First Chinese Office Action dated Jun. 1, 2026, for corresponding Chinese Application No. 202280002851.2, 23 pgs.

Zhang J., et al.,. MDU-Net: multi-scale densely connected U-Net for biomedical image segmentation. Health Inf Sci Syst. Dec. 2, 2018, 10 pgs.

* cited by examiner

400A

COMPUTER-IMPLEMENTED METHOD, METHOD OF TRAINING DEEP LEARNING MODEL, ELECTRONIC DEVICE, AND MEDIUM

CROSS-REFERENCE TO RELATED APPLICATION(S)

This application is a Section 371 National Stage Application of International Application No. PCT/CN2022/115134, filed on Aug. 26, 2022, entitled "METHOD OF DETECTING OBJECT, METHOD OF TRAINING DEEP LEARNING MODEL, ELECTRONIC DEVICE, AND MEDIUM", the content of which is incorporated herein by reference in its entirety.

TECHNICAL FIELD

The present disclosure relates to a field of an artificial intelligence technology, in particular to a computer-implemented method, a method of training a deep learning model, an electronic device, and a medium.

BACKGROUND

With a development of the artificial intelligence technology, the artificial intelligence technology has been widely applied in various fields. For example, in a field of medicine, the artificial intelligence technology may be used to perform an object detection to obtain a multi-mutation detection result.

SUMMARY

In view of this, the present disclosure provides a computer-implemented method, a method of training a deep learning model, an electronic device, and a medium.

In an aspect of the present disclosure, a computer-implemented method is provided, including: obtaining a target image segmentation result according to a target medical image of a target part, wherein the target medical image includes a medical image in at least one modality; obtaining target fusion data according to the target medical image segmentation result and a medical image in a predetermined modality in the target medical image; and obtaining a target multi-mutation detection result according to the target fusion data.

In another aspect of the present disclosure, a method of training a deep learning model is provided, including: obtaining a sample image segmentation result according to a sample medical image of a sample part, wherein the sample medical image includes a medical image in at least one modality; obtaining sample fusion data according to the sample image segmentation result and a medical image in a predetermined modality in the sample multi-modal medical image; obtaining a sample multi-mutation detection result according to the sample fusion data; and training the deep learning model by using the sample image segmentation result, a sample image segmentation label of the sample medical image, the sample multi-mutation detection result, and a sample multi-mutation label of the sample medical image.

In another aspect of the present disclosure, an electronic device is provided, including: one or more processors; and a memory for storing one or more programs, wherein the one or more programs are configured to, when executed by the one or more processors, cause the one or more processors to implement the methods described in the present disclosure.

In another aspect of the present disclosure, a computer readable storage medium having computer executable instructions therein is provided, and the instructions are configured to, when executed by a processor, cause the processor to implement the methods described in the present disclosure.

In another aspect of the present disclosure, a computer program product containing a computer program, wherein the computer program is configured to, when executed by a processor, cause the processor to implement the methods described in the present disclosure.

BRIEF DESCRIPTION OF THE DRAWINGS

The above and other objectives, features and advantages of the present disclosure will be clearer with following descriptions of the present disclosure with reference to the accompanying drawings, in which.

DETAILED DESCRIPTION OF EMBODIMENTS

Figure 1:
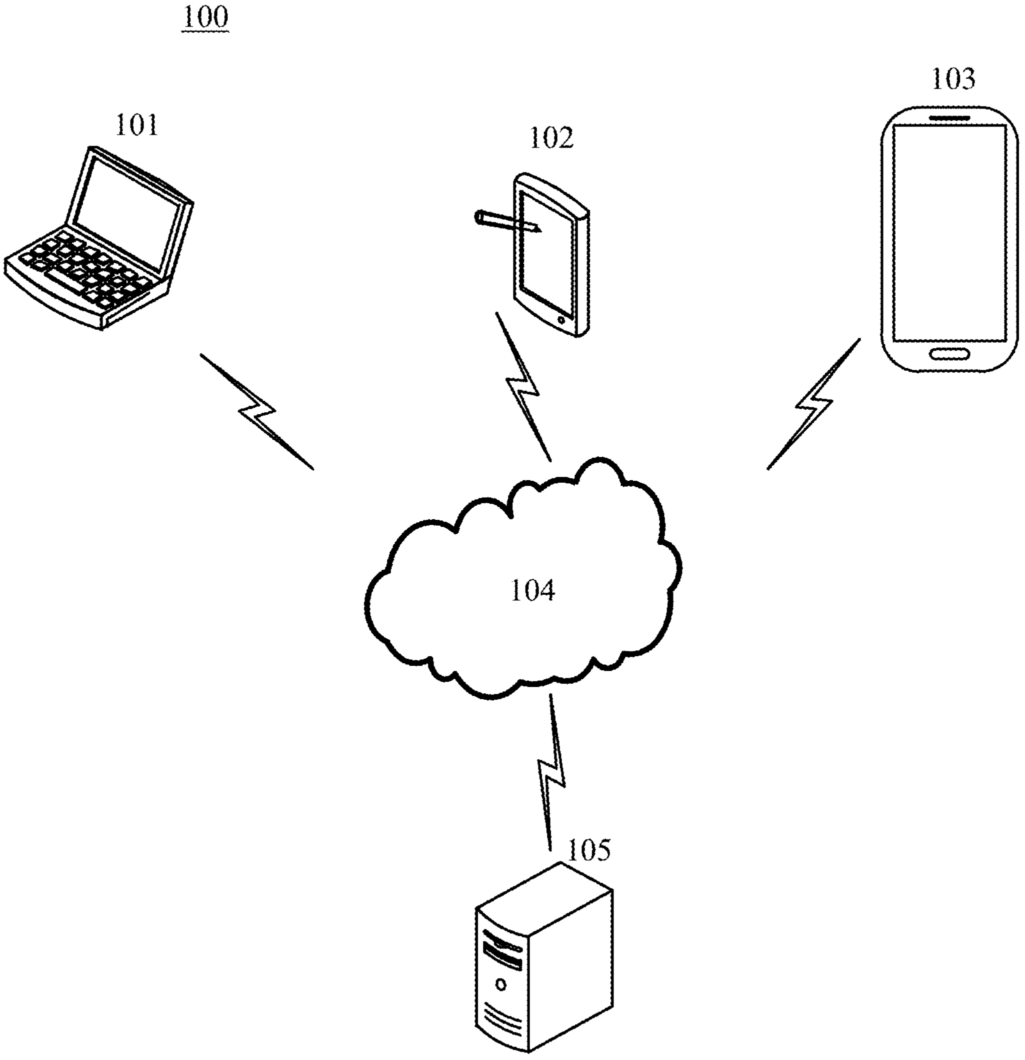
FIG. 1 schematically shows an exemplary system architecture to which a computer-implemented method and an apparatus, and a method and an apparatus of training a deep learning model may be applied according to embodiments of the present disclosure.

Embodiments of the present disclosure will be described below with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

Terms used herein are for the purpose of describing specific embodiments only and are not intended to limit the present disclosure. The terms “including”, “containing”, etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to “at least one of A, B and C”, it should be explained according to the meaning of the expression generally understood by those skilled in the art (for example, “a system including at least one of A, B and C” should include but not be limited to a system including A alone, a system including B alone, a system including C alone, a system including A and B, a system including A and C, a system including B and C, and/or a system including A, B and C). In a case of using the expression similar to “at least one of A, B or C”, it should be explained according to the meaning of the expression generally understood by those skilled in the art (for example, “a system including at least one of A, B or C” should include but not be limited to a system including A alone, a system including B alone, a system including C alone, a system including A and B, a system including A and C, a system including B and C, and/or a system including A, B and C).

Genome analysis has been widely applied with a development of high-throughput arrays and next-generation sequencing technologies. Imaging genomics is an interdisciplinary technology in which medical imaging technology and genomics technology are combined. By studying a relationship between an abnormal image feature and at least one of genome or molecular feature, on the one hand, the imaging genomics may be used to speculate a biological mechanism of a disease and promote a deep understanding of an overall phenotype; on the other hand, it may be used to determine an image biomarker for predicting a macro level of genome, so as to achieve a non-invasive diagnosis, a prognosis evaluation and an efficacy evaluation of a complex disease, and provide a more comprehensive evaluation method for an object to understand an impact of genes on disease.

For example, a gene mutation may be determined based on the imaging genomics. A gene mutation detection has an important clinical value for at least one of a disease grading, a molecular classification, a medication guidance, or a prognosis evaluation of a disease. However, in a gene test, it is required to extract a tissue sample by a stereotactic biopsy or a resection surgery, and then perform sequencing by a gene sequencing center to determine a gene feature, which is an invasive detection method that may cause damage to the object. In addition, in a case of a poor accessibility of a target part, it is challenging to obtain the tissue sample, which results in a long sequencing time and a high testing cost. For example, the sequencing may take one to two weeks, and the testing cost may be 7000 to 10000 yuan.

In view of this, embodiments of the present disclosure provide an imaging genomics-based solution for a non-invasive detection of object. For example, a target image segmentation result may be obtained according to a target medical image of a target part. The target medical image may include a medical image in at least one modality. Target fusion data may be obtained according to the target medical image segmentation result and a medical image in a predetermined modality in the target medical image. A target multi-mutation detection result may be obtained according to the target fusion data.

According to embodiments of the present disclosure, a position of a mutated tissue may be accurately reflected according to the target image segmentation result. On this basis, by obtaining the target fusion data according to the target image segmentation result and a medical image in a predetermined modality in the target medical image and then obtaining the target multi-mutation detection result according to the target fusion data, an image segmentation and a multi-mutation detection may be combined, so that the mutation detection may be more comprehensive and accurate. In addition, since the above-mentioned method is a non-invasive detection method without obtaining a tissue sample from the target part, it is not affected by the time of obtaining a tissue sample and the difficulty in sequencing, so that the detection time and cost may be reduced.

FIG. 1 schematically shows an exemplary system architecture to which a computer-implemented method and an apparatus, and a method and an apparatus of training a deep learning model may be applied according to embodiments of the present disclosure.

It should be noted that FIG. 1 is merely an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios. For example, in other embodiments, the exemplary system architecture to which the computer-implemented method and the apparatus and the method and the apparatus of training the deep learning model may include a terminal device, but the terminal device may implement the computer-implemented method and the apparatus and the method and the apparatus of training the deep learning model provided in embodiments of the present disclosure without interacting with a server.

As shown in FIG. 1, a system architecture 100 according to such embodiments may include terminal devices 101, 102 and 103, a network 104, and a server 105. The network 104 is a medium for providing a communication link between the terminal devices 101, 102, 103 and the server 105. The network 104 may include various connection types, such as wired and/or wireless communication links, or the like.

The terminal devices 101, 102 and 103 may be used by a user to interact with the server 105 through the network 104 to receive or send messages, etc. The terminal devices 101, 102 and 103 may be installed with various communication client applications, such as shopping applications, web browser applications, search applications, instant messaging tools, email clients and/or social platform software, etc. (just for example).

The terminal devices 101, 102 and 103 may be various electronic devices having display screens and supporting web browsing, including but not limited to smart phones, tablet computers, laptop computers, desktop computers, or the like.

The server 105 may be various types of servers that provide various services. For example, the server 105 may be a cloud server, also known as a cloud computing server or a cloud host, which is a host product in a cloud computing service system to solve shortcomings of difficult management and weak service scalability existing in a conventional physical host and VPS (Virtual Private Server) service. The server 105 may also be a server of a distributed system or a server combined with a block-chain.

It should be noted that the computer-implemented method provided in embodiments of the present disclosure may generally be performed by the terminal device 101, 102 or 103. Accordingly, the apparatus provided in embodiments of the present disclosure may also be arranged in the terminal device 101, 102 or 103.

Alternatively, the computer-implemented method provided in embodiments of the present disclosure may generally be performed by the server 105. Accordingly, the apparatus provided in embodiments of the present disclosure may be generally arranged in the server 105. The computer-implemented method provided in embodiments of the present disclosure may also be performed by a server or server cluster different from the server 105 and capable of communicating with the terminal devices 101, 102, 103 and/or the server 105. Accordingly, the apparatus provided in embodiments of the present disclosure may also be arranged in a server or server cluster different from the server 105 and capable of communicating with the terminal devices 101, 102, 103 and/or the server 105.

It should be noted that the method of training the deep learning model provided by embodiments of the present disclosure may generally be performed by the server 105. Accordingly, the apparatus of training the deep learning model provided in embodiments of the present disclosure may be generally arranged in the server 105. The method of training the deep learning model provided in embodiments of the present disclosure may also be performed by a server or server cluster different from the server 105 and capable of communicating with the terminal devices 101, 102, 103 and/or the server 105. Accordingly, the apparatus of training the deep learning model provided in embodiments of the present disclosure may also be arranged in a server or server cluster different from the server 105 and capable of communicating with the terminal devices 101, 102, 103 and/or the server 105.

Alternatively, the method of training the deep learning model provided in embodiments of the present disclosure may generally be performed by the terminal device 101, 102 or 103. Accordingly, the apparatus of training the deep learning model provided by embodiments of the present disclosure may also be arranged in the terminal device 101, 102 or 103.

It should be understood that the number of terminal devices, network and server shown in FIG. 1 are merely schematic. According to implementation needs, any number of terminal devices, networks and servers may be provided.

It should be noted that a sequence number of each operation in the following methods is merely used to represent the operation for ease of description, and should not be regarded as indicating an execution order of each operation. Unless explicitly stated, the methods do not need to be performed exactly in the order shown.

Figure 2:
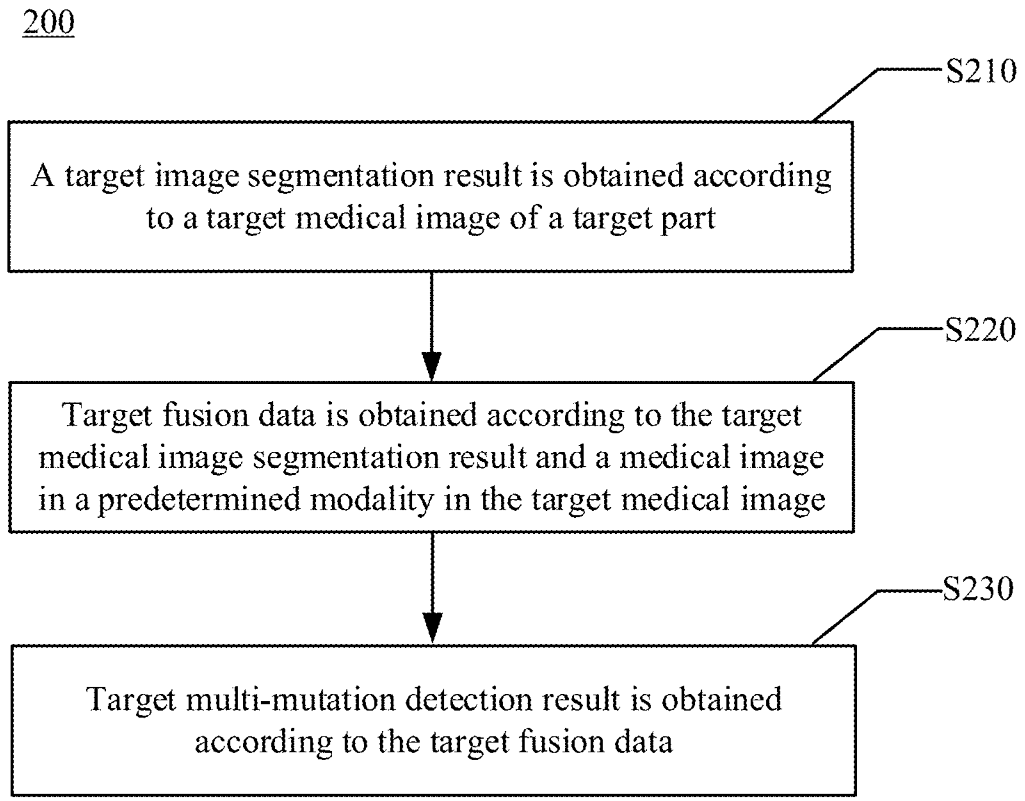
FIG. 2 schematically shows a flowchart of a computer-implemented method according to embodiments of the present disclosure.

FIG. 2 schematically shows a flowchart of a computer-implemented method according to embodiments of the present disclosure.

As shown in FIG. 2, a method 200 includes operations S210 to S230.

In operation S210, a target image segmentation result is obtained according to a target medical image of a target part.

In operation S220, target fusion data is obtained according to the target medical image segmentation result and a medical image in a predetermined modality in the target medical image.

In operation S230, a target multi-mutation detection result is obtained according to the target fusion data.

According to embodiments of the present disclosure, the target medical image may include a medical image in at least one modality.

According to embodiments of the present disclosures, a medical image may be important data in the field of medicine and plays a significant role in assisting doctors in diagnosis and pathological research. The medical image may be used for a mutation detection. The medical image may include at least one selected from: MRI (Magnetic Resonance Imaging) image, CT (Computerized Tomography) image, ECT (Emission Computed Tomography) image, PET (Positron Emission Computed Tomography) image, ultrasound image, OCT (Optical Coherence Tomography) image, or radiography. The medical image may be a three-dimensional medical image. The target medical image may include at least one selected from: a target MRI image, a target CT image, a target ECT image, a target PET image, a target ultrasound image, a target OCT image, or a target radiography.

According to embodiments of the present disclosures, the medical image may include at least one of a mono-modal medical image or a multi-modal medical image. Multi-modality may refer to different forms of a medical image, or at least two different types of medical images. For example, an MRI image may be a multi-modal MRI image, which may include at least two selected from a T1 modal image (i.e., T1 weighted image), a T2 modal image (i.e., T2 weighted image), a TICE modal image (i.e., contrast-enhanced T1 weighted image), or a FLAIR (Fluid Attenuated Inversion Recovery) modal image. The predetermined modality may refer to at least some of at least one modality. For example, when the medical image is a mono-modal medical image, the medical image in the predetermined modality may refer to the mono-modal medical image. When the medical image is a multi-modal medical image, the predetermined modality may include one or at least two of a plurality of modalities. For example, when the multi-modal medical image is a multi-modal MRT image, the predetermined modality may include at least one of a T1 modality, a T2 modality, a TICE modality, or a FLAIR modality.

According to embodiments of the present disclosure, the target part may refer to a part of a target object that requires a multi-mutation detection. The part may include at least one of brain, eyes, ears, nose, mouth, throat, face, thyroid, trachea, lungs, heart, esophagus, respiratory tract, bronchi, liver, gallbladder, pancreas, stomach, intestine, pelvic cavity, rectum, cervical spine, thoracic spine, lumbar spine, sacrum, feet, hip joint, wrist joint, finger joint, or knee joint, etc. It should be noted that the above are just examples and the part may further include other parts. The medical image for the multi-mutation detection may be determined according to a structural feature of the target part. For example, when the target part is the brain, the multi-mutation detection may be performed using a multi-modal medical image. When the target part is the lungs, the multi-mutation detection may be performed using a mono-modal medical image.

According to embodiments of the present disclosure, a lesion may occur in the target part. For example, a tumor may occur in the target part. A tumor region may include at least one of an edema region, an enhancing tumor region, a non-enhancing tumor region, or a necrotic region. In addition, the tumor region may include at least one of an entire tumor region, a tumor core region, or a tumor core enhancing region. The entire tumor region may include the edema region, the enhancing tumor region, the non-enhancing tumor region, and the necrotic region. The tumor core region may include the enhancing tumor region, the non-enhancing tumor region, and the necrotic region. The tumor core enhancing region may include the enhancing tumor region.

According to embodiments of the present disclosures, a tumor may include a primary tumor and a secondary tumor. The primary tumor may include a benign tumor and a malignant tumor. The lesion may be related to a gene mutation.

For example, when the target part is the brain of the target object, a brain tumor may include at least one of acoustic neuroma, pituitary adenoma, meningioma, tumor originating from embryonic residual tissue, or neuroglioma (i.e., brain glioma). The tumor originating from embryonic residual tissue may include at least one of craniopharyngioma, epidermoid cyst, or chordoma. The brain glioma may include at least one of glioblastoma, astrocytoma, oligodendroglioma, or medulloblastoma. According to a malignant level of tumor, the brain glioma may include at least one of low-grade brain glioma or high-grade brain glioma. The low-grade brain glioma is a benign tumor with good prognosis. The high-grade brain glioma is a malignant tumor with poor prognosis. A gene feature detection of brain glioma may be a basis for a precise diagnosis and treatment of brain glioma.

According to embodiments of the present disclosure, multi-gene mutation corresponding to brain glioma may include at least two of Isocitrate: NAD+Oxidoreductase (Decarboxylating) (IDH) mutation, chromosome 1p/19q co-deletion mutation, Telomerase Reverse Tranase (TERT) mutation, 06-Methylguanine-Deoxyribose Nucleic Acid Methyltransferase (MGMT) promoter methylation mutation, Epidermal Growth Factor Receptor Variant (EGFRv) amplification, X-linked Alpha Thalassemia Mental Retardation Syndrome (ATRX), or Notch signaling pathway.

For example, when the target part is the lungs of the target object, a lung tumor may include at least one of a small cell lung tumor or a non-small cell lung tumor. The multi-gene mutation corresponding to the non-small cell lung tumor may include at least two of EGFR (Epidermal Growth Factor Receptor) mutation or KRAS (V-Ki-ras2 Kirsten Ratsarcoma Viral Oncogene Homolog) mutation, etc.

For example, when the target part is a colorectum of the target object, the multi-gene mutation corresponding to a colorectal tumor may include at least two of KRAS mutation, NRAS mutation, or BRAF mutation, etc.

According to embodiments of the present disclosure, the target medical image of the target part may be processed using an image segmentation method to obtain the target image segmentation result. For example, the image segmentation method may include at least one of a traditional image segmentation method or a deep learning-based image segmentation method. The traditional image segmentation method may include at least one of a fuzzy clustering-based image segmentation method, a threshold-based image segmentation method, a region growing-based image segmentation method, or a deformation-based image segmentation method. The deep learning-based image segmentation method may include at least one of an encoder-decoder-based deep learning model or a fully convolutional neural network-based deep learning model. The encoder-decoder-based deep learning model may include at least one of a Transformer-based deep learning model or a convolutional neural network-based deep learning model. The encoder-decoder may include symmetric encoder-decoder or asymmetric encoder-decoder. Model architectures of Transformer-based deep learning model and fully convolutional neural network-based deep learning model may include U-shaped model architecture or V-shaped model architecture. For example, the deep learning model may include at least one of U-Net, D-LinkNet, or MDU-Net (i.e., Multi-scale Densely Connected U-Net).

According to embodiments of the present disclosure, processing the target medical image using the deep learning-based image segmentation method to obtain the target image segmentation result may include: processing the target medical image using an image segmentation model to obtain the target image segmentation result. The image segmentation model may be obtained by training a first deep learning model using a first sample medical image. A model structure of the first deep learning model may be determined according to actual service needs and is not limited here.

According to embodiments of the present disclosure, the target medical image segmentation result may be fused with the medical image in the predetermined modality in the target medical image to obtain the target fusion data. The target fusion data may be processed to obtain the target multi-mutation detection result.

According to embodiments of the present disclosure, the position of the mutated tissue may be accurately reflected according to the target image segmentation result. On this basis, by obtaining the target fusion data according to the target image segmentation result and the medical image in the predetermined modality in the target medical image and then obtaining the target multi-mutation detection result according to the target fusion data, an image segmentation and a multi-mutation detection may be combined, so that the mutation detection may be more comprehensive and accurate. In addition, since the above-mentioned method is a non-invasive detection method without obtaining a tissue sample from the target part, it is not affected by the time of obtaining a tissue sample and the difficulty in sequencing, so that the detection time and cost may be reduced.

According to embodiments of the present disclosure, the target part may include the brain. The target multi-mutation detection result may include at least two of a target IDH mutation detection result, a target chromosome 1p/19q co-deletion mutation detection result, a target TERT mutation detection result, or a target MGMT promoter methylation mutation detection result.

According to embodiments of the present disclosure, IDH is an important protein existing in sugar metabolism, which catalyzes an oxidative decarboxylation of isocitrate to α-ketoglutarate (i.e., α-KG). Reduced Nicotinamide Adenine Dinucleotide Phosphate (NADPH) or NADH is produced during the above process. α-KG is a substrate for various dioxygenases that control histone modifications, and plays an important role in regulating a glutamate production and a cellular reaction to oxidation and energy stress. IDH mutation may lead to an abnormal production and accumulation of D-2-hydroxyglutaric acid (D-2-HG), resulting in changes in cellular energy and methylation groups. The target IDH mutation detection result may include at least one of a target IDH mutant-type detection result or a target IDH wild-type detection result.

According to embodiments of the present disclosure, the chromosome 1p/19q co-deletion may refer to a simultaneous deletion of short arm of Chromosome 1 and long arm of Chromosome 19. The chromosome 1p/19q co-deletion is highly related to oligodendroglioma and is a molecular marker. The chromosome 1p/19q co-deletion is related to IDH gene mutation, which means that an IDH gene mutation occurs in a case of chromosome 1p/19q co-deletion. The target chromosome 1p/19q co-deletion mutation detection result may include a detection result of co-deletion of target chromosome 1p/19q or a detection result of no co-deletion of target chromosome 1p/19q.

According to embodiments of the present disclosure, telomerase is a ribonucleoprotein polymerase with reverse transcription activity. The activity of telomerase may depend on a transcriptional regulation of TERT with catalytic activity. The activity of telomerase is positively correlated with an expression of TERT. TERT promoter mutation may lead to telomerase activation, resulting in a cell immortalization. The target TERT mutation detection result may include a target TERT mutant-type detection result and a target TERT wild-type detection result.

According to embodiments of the present disclosure, MGMT may be a DNA repair protein, which may be used to remove an alkyl adduct mutagenic at $O^6$ site of guanine on DNA, restore the damaged guanine, and thus protect the cell immunity from the damage of alkylating agents. A CpG site in a normal tissue is in a non-methylation state, and the MGMT promoter methylation may cause an MGMT expression deletion, resulting in a decrease in MGMT content and hindered DNA repair in cells. The MGMT promoter methylation may be one of mechanisms underlying the occurrence and development of brain glioma. The target MGMT promoter methylation mutation detection result may include a detection result of methylation of target MGMT promoter or a detection result of no methylation of target MGMT promoter.

According to embodiments of the present disclosure, clinical researches have shown that a state of multi-gene mutation may affect a survival period of the object. For example, the prognosis of the target IDH mutant-type is better than that of the target IDH wild-type. An object with chromosome 1p/19q co-deletion may have a long survival period.

According to embodiments of the present disclosure, a high-precision multi-mutation detection of target IDH mutation, target chromosome 1p/19q co-deletion, target TERT mutation and MGMT promoter methylation for brain glioma may be achieved based on rich target multi-modal medical images.

According to embodiments of the present disclosure, the above-mentioned computer-implemented method may further include the following operations.

An original medical image is pre-processed to obtain the target medical image.

According to embodiments of the present disclosures, pre-processing may include at least one of image clipping, re-sampling, or data normalization. The data normalization may include a zero-mean normalization.

According to embodiments of the present disclosures, the original medical image may include a medical image in at least one modality. An image clipping may be performed on the original medical image to obtain the target medical image containing a target tissue of the target part. For example, a first bounding box corresponding to the at least one modality may be determined according to the medical image in the at least one modality included in the original medical image, so as to obtain at least one first bounding box. A union region of the at least one first bounding box may be determined to obtain a first target bounding box. An image clipping may be performed on the medical image in the at least one modality included in the original medical image by using the first target bounding box, so as to obtain the target medical image. For example, a pixel value of a region where the first target bounding box is located in the original medical image may be set as a first predetermined pixel value, and a pixel value of a region outside the first target bounding box in the original medical image may be set as a second predetermined pixel value. The first predetermined pixel value and the second predetermined pixel value may be determined according to actual service needs and are not limited here. For example, the first predetermined pixel value may be 1, and the second predetermined pixel value may be 0. In addition, a data normalization may be performed on the original medical image to obtain the target medical image.

According to embodiments of the present disclosure, a re-sampling may be performed on the original medical image to obtain the target medical image. In a case of a plurality of target medical images, volume pixels of the plurality of target medical images represent a consistent actual physical space.

According to embodiments of the present disclosures, the original medical image may include a medical image in at least one modality. An image clipping may be performed on the original medical image to obtain a first intermediate medical image. A data normalization may be performed on the first intermediate medical image to obtain the target medical image.

According to embodiments of the present disclosure, an image clipping may be performed on the original medical image to obtain a second intermediate medical image. A re-sampling may be performed on the second intermediate medical image to obtain a third intermediate medical image. A data normalization may be performed on the third intermediate medical image to obtain the target medical image.

According to embodiments of the present disclosure, the target medical image may be processed to obtain the target image segmentation result, the target medical image is obtained by pre-processing the original medical image, and the preprocessing may include at least one of image cropping, re-sampling or data normalization, so that an accuracy of the image segmentation result may be improved. In addition, after image clipping, it is possible to reduce an image size and improve a computation efficiency while effectively ensuring the accuracy of image segmentation result and multi-mutation detection result.

According to embodiments of the present disclosure, operation S210 may include the following operations.

Target image feature data in at least one scale is obtained according to the target medical image of the target part. The target image segmentation result is obtained according to the target image feature data in at least one scale.

According to embodiments of the present disclosure, a feature extraction may be performed on the target medical image to obtain the target image feature data in at least one scale. For example, a first deep learning model may include a down-sampling module and an up-sampling module. The target medical image may be processed using the down-sampling module of the first deep learning model to obtain the target image feature data in at least one scale. The down-sampling module may include a first convolutional neural network or a Transformer-based encoder. Transformer may include a visual Transformer. The visual transformer may include at least one of Vision Transformer or Swin Transformer. The first convolutional neural network may include at least one of ResNet (Residual Neural Network), VGGNet (Visual Geometry Group Network), WideResNet (Wide Residual Network), or DenseNet (Dense Neural Network).

According to embodiments of the present disclosure, the down-sampling module may include at least one cascaded down-sampling unit. When the down-sampling module includes a Transformer-based encoder, the down-sampling unit may include a first convolutional sub-unit and a pooling sub-unit. The first convolutional sub-unit may include at least one first convolutional layer. The pooling sub-unit may include at least one pooling layer. The medical image sequentially passes through the at least one cascaded down-sampling unit, and a feature map with a reduced size corresponding to the image feature data may be obtained each time the medical image passes through a down-sampling unit. The down-sampling unit may be used to perform down-sampling on the image feature data in a scale corresponding to the feature extraction unit.

According to embodiments of the present disclosure, the target image feature data in at least one scale may be processed to obtain the target image segmentation result. For example, the target image feature data in at least one scale may be processed using the up-sampling module to obtain the target image segmentation result. The up-sampling module may include at least one cascaded up-sampling unit. The up-sampling unit may include a second convolutional sub-unit and an up-sampling sub-unit. The second convolutional sub-unit may include at least one second convolutional layer. The up-sampling sub-unit may include at least one selected from: at least one up-sampling layer, at least one transposed convolutional layer, at least one de-pooling layer, or at least one linear interpolation layer.

According to embodiments of the present disclosure, since the target image segmentation result is obtained according to the target image feature data in at least one scale, richness of the image feature data may be improved, and then the accuracy of the image segmentation result may be improved. In addition, when the target image is a three-dimensional image which may provide a more accurate structural relationship, a three-dimensional image segmentation may be performed on the target image to fully utilize a three-dimensional feature of the three-dimensional image and improve the accuracy of the image segmentation result.

According to embodiments of the present disclosure, the at least one scale may include J scales.

According to embodiments of the present disclosure, obtaining the target image segmentation result according to the target image feature data in at least one scale may include the following operations.

In a case of $1 \leq j < J$, $j^{th}$-scale fusion image feature data is obtained according to $j^{th}$-scale target image feature data and $j^{th}$-scale up-sampling image feature data. The target image segmentation result is obtained according to $1^{st}$-scale fusion image feature data.

According to embodiments of the present disclosure, J may be an integer greater than or equal to 1, and j may be an integer greater than or equal to 1 and less than or equal to J. A value of J may be determined according to actual service needs and is not limited here. $j \in \{1, 2, \ldots, J-1, J\}$.

According to embodiments of the present disclosure, the $j^{th}$-scale up-sampling image feature data may be obtained according to $(j+1)^{th}$-scale target image feature data and $(j+1)^{th}$-scale up-sampling image feature data, and the $j^{th}$-scale target image feature data may be obtained according to $(j-1)^{th}$-scale target image feature data.

According to embodiments of the present disclosure, in a case of $j=J$, $j^{th}$-scale fusion image feature data may be obtained according to the $j^{th}$-scale target image feature data.

According to embodiments of the present disclosure, in a case of $1 < j \leq J$, a feature extraction is performed according to $(j-1)^{th}$-scale target image feature data to obtain $j^{th}$-scale first intermediate image feature data. A pooling operation is performed according to the $j^{th}$-scale first intermediate image feature data to obtain the $j^{th}$-scale target image feature data. In a case of $j=1$, a feature extraction is performed on the target medical image to obtain $1^{st}$-scale first intermediate image feature data. A pooling operation is performed according to the $1^{st}$-scale first intermediate image feature data to obtain $1^{st}$-scale target image feature data.

According to embodiments of the present disclosure, in a case of $1 < j \leq J$, a feature extraction is performed according to the $j^{th}$-scale fusion image feature data to obtain $j^{th}$-scale second intermediate image feature data. An up-sampling operation is performed on the $j^{th}$-scale second intermediate image feature data to obtain the $j^{th}$-scale up-sampling image feature data.

According to embodiments of the present disclosure, in a case of $j=1$, a feature extraction is performed on the $1^{st}$-scale fusion image feature data to obtain $1^{st}$-scale second intermediate image feature data. The $1^{st}$-scale second intermediate image feature data is determined as the target image segmentation result.

According to embodiments of the present disclosure, the target medical image may be processed using U-Net to obtain the target image segmentation result. Alternatively, the target medical image may be processed using D-LinkNet to obtain the target image segmentation result.

According to embodiments of the present disclosure, the $j^{th}$-scale fusion image feature data is obtained according to the $j^{th}$-scale target image feature data and the $j^{th}$-scale up-sampling image feature data. The $j^{th}$-scale up-sampling image feature data may change a low-resolution image containing a deep abstract feature into a high-resolution image while maintaining the deep abstract feature. On this basis, the $j^{th}$-scale up-sampling image feature data is fused with the target image feature data, and the target image segmentation result is obtained according to the $1^{st}$-scale fusion image feature data, so that the accuracy of the image segmentation result may be improved.

According to embodiments of the present disclosure, the at least one scale may include K scales.

According to embodiments of the present disclosure, obtaining the target image segmentation result according to the target image feature data in at least one scale may include the following operations.

In a case of $1 \le k < K$, $k^{th}$-scale fusion image feature data is obtained according to $k^{th}$-scale target image feature data, $(k-1)^{th}$-scale target image feature data, $(k+1)^{th}$-scale target image feature data, and $k^{th}$-scale up-sampling image feature data. The target image segmentation result is obtained according to $1^{st}$-scale fusion image feature data.

According to embodiments of the present disclosure, K may be an integer greater than or equal to 1, and k may be an integer greater than or equal to 1 and less than or equal to K. A value of K may be determined according to actual service needs and is not limited here. $k \in \{1, 2, \ldots, K-1, K\}$.

According to embodiments of the present disclosure, the $k^{th}$-scale up-sampling image feature data may be obtained according to the $(k+1)^{th}$-scale target image feature data, the $k^{th}$-scale target image feature data, $(k+2)^{th}$-scale target image feature data, and $(k+1)^{th}$-scale up-sampling image feature data. The $k^{th}$-scale target image feature data may be obtained according to the $(k-1)^{th}$-scale target image feature data.

According to embodiments of the present disclosure, the $k^{th}$-scale target image feature data may be obtained by performing a feature extraction on the $(k-1)^{th}$-scale target image feature data.

According to embodiments of the present disclosure, the target medical image may be processed using MDU-Net to obtain the target image segmentation result. MDU-Net uses UNet as a network skeleton, and fuses target image feature data in adjacent upper and lower scales, so that a propagation of feature in a current scale is enhanced.

According to embodiments of the present disclosure, the target medical image may include a target multi-modal medical image. The target multi-modal medical image may include medical images in a plurality of modalities.

According to embodiments of the present disclosure, operation S220 may include the following operations.

First target tumor region feature data is obtained according to the target image segmentation result and a medical image in a first predetermined modality in the target multi-modal medical image. The target fusion data is obtained according to the first target tumor region feature data and a medical image in a second predetermined modality in the target multi-modal medical image.

According to embodiments of the present disclosure, the medical image in the first predetermined modality may refer to an image that may clearly display a shape, a size and a position of a tumor. The medical image in the second predetermined modality may refer to an image that may clearly display an anatomical feature.

According to embodiments of the present disclosure, an intersection region between the target image segmentation result and the medical image in the first predetermined modality may be determined to obtain the first target tumor region feature data. The first target tumor region feature data may be fused with the medical image in the second predetermined modality to obtain the target fusion data.

According to embodiments of the present disclosure, due to the intersection and complementarity between medical images in various modalities, the accuracy of the image segmentation result and the object detection result may be improved by performing an image segmentation and an object detection using the target multi-modal medical image. In addition, a redundancy of the first target tumor region feature data may be reduced by using the intersection region between the target image segmentation result and the medical image in the first predetermined modality as the first target tumor region feature data.

According to embodiments of the present disclosure, the target multi-modal medical image may include a target multi-modal magnetic resonance image. The medical image in the first predetermined modality may include an image in T2 modality. The medical image in the second predetermined modality may include an image in T1 modality.

According to embodiments of the present disclosure, MRI may image a soft tissue of the object with a high resolution and a high contrast, and may perform a multi-directional observation with a large field of view, so that a tumor region and a normal region may be effectively distinguished. In MRI, it is possible to obtain sequencing images with various contrasts by configuring parameters. Each sequencing image has respective characteristics and may highlight a corresponding region. The sequencing image may be referred to as a modal image. Due to a great difference between tissues in terms of size, shape and density, it is difficult to distinguish the tissues using a mono-modal MRI image. Therefore, a multi-modal MRI image may be used to provide complementary and more accurate information for corresponding tasks.

According to embodiments of the present disclosure, the multi-modal MRI image may include at least two selected from an image in T1 modality, an image in T2 modality, an image in TICE modality, or an image in FLAIR modality. The image in T1 modality may be an image obtained by radiography using T1 contrast agent. T1 may refer to a longitudinal relaxation time of water molecules in tissues. T1 contrast agent may restore a forward image at a scan section by enhancing an image signal, and different metal elements may be added to enhance an image clarity. The image in T1 modality is a forward MRI image that exhibits significant differences in images of tissues with different longitudinal relaxation times. It is possible to obtain an anatomical structure of each section by the image in T1 modality.

According to embodiments of the present disclosure, the image in T2 modality may be an image obtained by radiography using T2 contrast agent. T2 may refer to a lateral relaxation time of water molecules in tissues. Since the tumor region is less affected by contrast agent, while the normal region is more affected by contrast agent, the tumor region may be determined by the image in T2 modality.

According to embodiments of the present disclosure, the image in TICE modality may be obtained by adding metal gadolinium to the T1 contrast agent. A bright region in the image in TICE modality has an abundant blood supply, while the tumor region is a region with faster blood flow. It is possible to determine a structure of a tumor necrosis region and a structure of an enhancing region by the image in TICE modality.

According to embodiments of the present disclosure, the image in FLAIR modality may be an image obtained by applying a reverse pulse with an opposite angle before a spin wave to reverse a direction of a magnetization vector and then stopping the reverse pulse to recover the magnetization vector. In the image in FLAIR modality, a depth value of the tumor region has a significant difference from a depth value of the normal region. Therefore, the image in FLAIR modality may be used as a basis for a localization of the tumor region and a determination of a contour.

According to embodiments of the present disclosure, the target medical image may include a target mono-modal medical image. The target mono-modal medical image may include a medical image in a single modality.

According to embodiments of the present disclosure, operation S220 may include the following operations.

Second target tumor region feature data is obtained according to the target image segmentation result and the target mono-modal medical image. The second target tumor region feature data is determined as the target fusion data.

According to embodiments of the present disclosure, the mono-modal medical image may include a CT image. An intersection region between the target image segmentation result and the target mono-modal medical image may be determined to obtain the second target tumor region feature data.

According to embodiments of the present disclosure, operation S230 may include the following operations.

The target fusion data is processed based on each of a plurality of first mutation processing strategies, so as to obtain a plurality of target mutation detection results respectively corresponding to the plurality of first mutation processing strategies. The target multi-mutation detection result is obtained according to the target mutation detection results respectively corresponding to the plurality of first mutation processing strategies.

According to embodiments of the present disclosure, the first mutation processing strategy may refer to a strategy for obtaining a mutation detection result. Each first mutation processing strategy may be used to process a gene mutation corresponding to that first mutation processing strategy. The first mutation processing strategy may correspond to the gene mutations respectively.

According to embodiments of the present disclosure, for each of the plurality of first mutation processing strategies, the target fusion data may be processed using that first mutation processing strategy to obtain the target mutation detection result corresponding to that first mutation processing strategy. For example, the target fusion data may be processed using a first artificial intelligence model corresponding to that first mutation processing strategy to obtain the target detection result corresponding to that first mutation processing strategy. The first artificial intelligence model may include at least one of a first machine learning model or a second deep learning model. The first artificial intelligence model may be trained using a second sample medical image and a sample mutation detection result of the second sample medical image.

According to embodiments of the present disclosure, operation S230 may include the following operations.

The target fusion data is processed based on a first single mutation processing strategy, so as to obtain the target multi-mutation detection result.

According to embodiments of the present disclosure, it is possible to obtain target mutation detection results for various gene mutations by using a same mutation processing strategy. For example, the target fusion data may be processed using a second artificial intelligence model corresponding to the first single mutation processing strategy, so as to obtain the target multi-mutation detection result. The second artificial intelligence model may include at least one of a second machine learning model or a third deep learning model. The second artificial intelligence model may be trained using a third sample medical image and a sample multi-mutation detection result of the third sample medical image.

According to embodiments of the present disclosure, operation S230 may include the following operations.

The target fusion data is processed based on a second single mutation processing strategy, so as to obtain intermediate feature data. The intermediate feature data is processed based on each of a plurality of second mutation processing strategies, so as to obtain a plurality of target mutation detection results respectively corresponding to the plurality of second mutation processing strategies. The target multi-mutation detection result is obtained according to the target mutation detection results respectively corresponding to the plurality of second mutation processing strategies.

According to embodiments of the present disclosure, the target fusion data may be processed using the second single mutation processing strategy to obtain the intermediate feature data. For each of the plurality of second mutation processing strategies, the intermediate feature data may be processed by that second mutation processing strategy to obtain the target mutation detection result corresponding to that second mutation processing strategy. For example, the target fusion data may be processed using a third artificial intelligence model corresponding to the second single mutation processing strategy to obtain the intermediate feature data. For each of the plurality of second mutation processing strategies, the intermediate feature data may be processed using a fourth artificial intelligence model corresponding to that second mutation processing strategy to obtain the target detection result corresponding to that second mutation processing strategy. The third artificial intelligence model may include at least one of a third machine learning model or a fourth deep learning model. The third artificial intelligence model may be trained using a fourth sample medical image and a sample multi-mutation detection result of the fourth sample medical image. The fourth artificial intelligence model may include at least one of a fourth machine learning model or a fifth deep learning model. The fourth artificial intelligence model may be trained using a fifth sample medical image and a sample mutation detection result of the fifth sample medical image.

The computer-implemented method according to embodiments of the present disclosure will be further described below with reference to FIG. 3A to FIG. 3F in conjunction with specific embodiments.

Figure 3A:
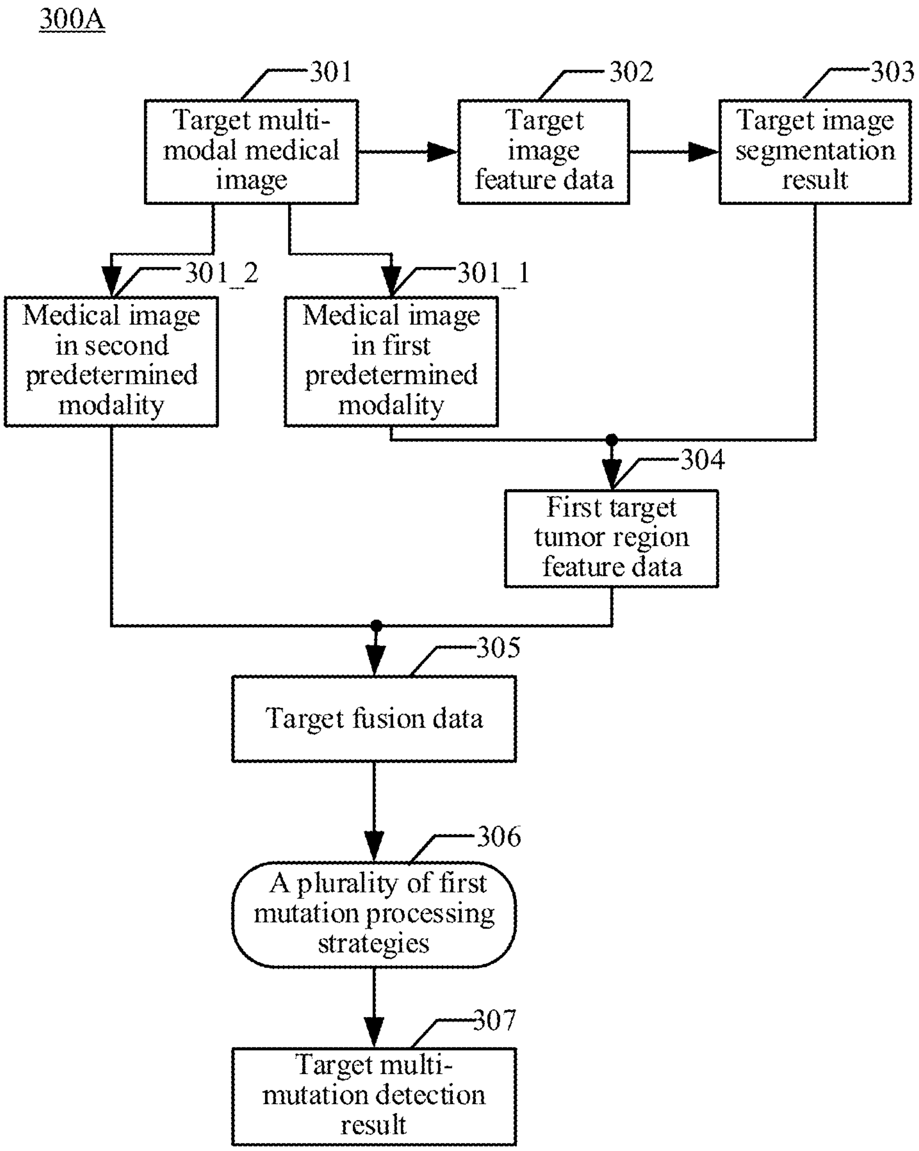
FIG. 3A schematically shows an example schematic diagram of the computer-implemented method according to embodiments of the present disclosure.

FIG. 3A schematically shows an example schematic diagram of the computer-implemented method according to embodiments of the present disclosure.

As shown in FIG. 3A, in 300A, target image feature data 302 in at least one scale is obtained according to a target multi-modal medical image 301 of a target part. A target image segmentation result 303 is obtained according to the target image feature data 302 in at least one scale. The target multi-modal medical image 301 may include a medical image 301_1 in a first predetermined modality and a medical image 301_2 in a second predetermined modality.

First target tumor region feature data 304 is obtained according to the target image segmentation result 303 and the medical image 301_1 in the first predetermined modality. Target fusion data 305 is obtained according to the first target tumor region feature data 304 and the medical image 301_2 in the second predetermined modality.

The target fusion data 305 is processed based on each of a plurality of first mutation processing strategies 306, so as to obtain a plurality of target mutation detection results respectively corresponding to the plurality of first mutation processing strategies 306. A target multi-mutation detection result 307 is obtained according to the target mutation detection results respectively corresponding to the plurality of first mutation processing strategies 306.

Figure 3B:
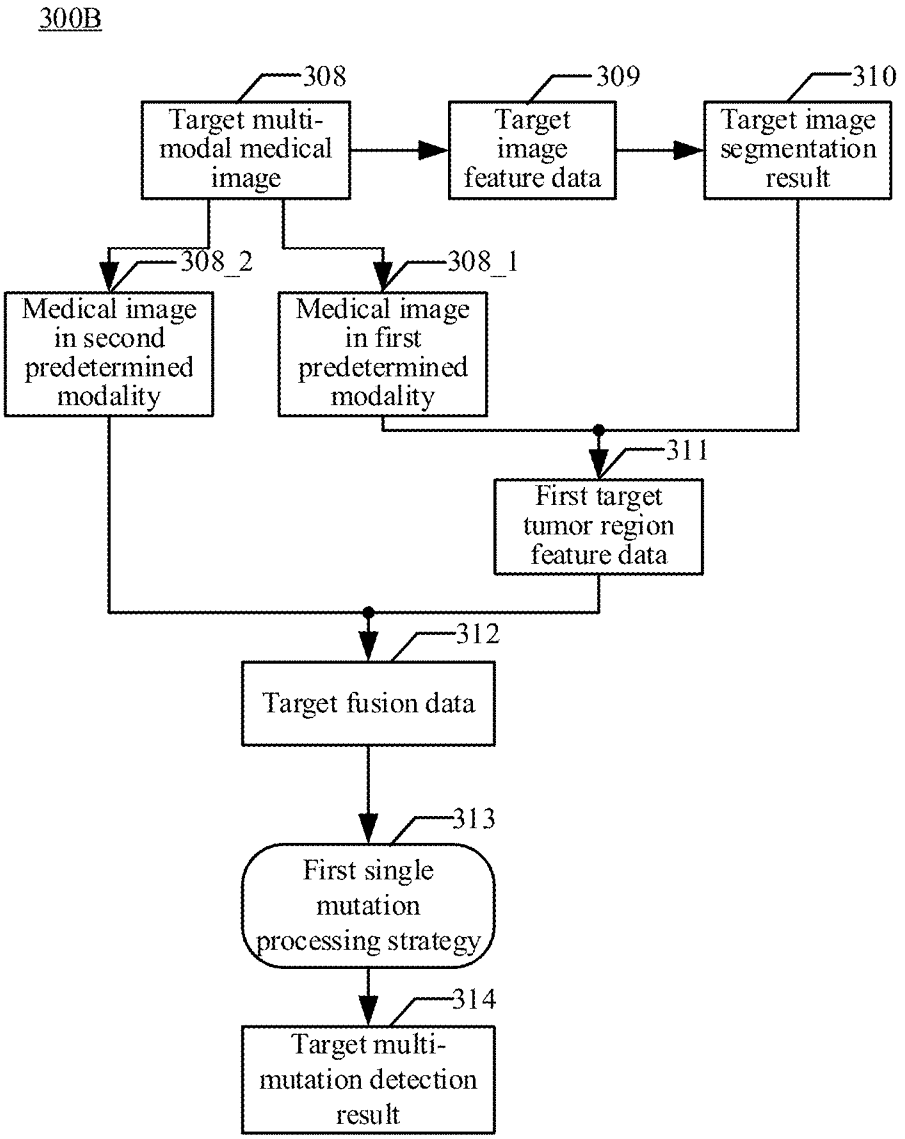
FIG. 3B schematically shows an example schematic diagram of the computer-implemented method according to other embodiments of the present disclosure.

FIG. 3B schematically shows an example schematic diagram of the computer-implemented method according to other embodiments of the present disclosure.

As shown in FIG. 3B, in 300B, target image feature data 309 in at least one scale is obtained according to a target multi-modal medical image 308 of the target part. A target image segmentation result 310 is obtained according to the target image feature data 309 in at least one scale. The target multi-modal medical image 308 may include a medical image 308_1 in a first predetermined modality and a medical image 308_2 in a second predetermined modality.

First target tumor region feature data 311 is obtained according to the target image segmentation result 310 and the medical image 308_1 in the first predetermined modality. Target fusion data 312 is obtained according to the first target tumor region feature data 311 and the medical image 308_2 in the second predetermined modality.

The target fusion data 312 is processed based on a first single mutation processing strategy 313, so as to obtain a target multi-mutation detection result 314.

Figure 3C:
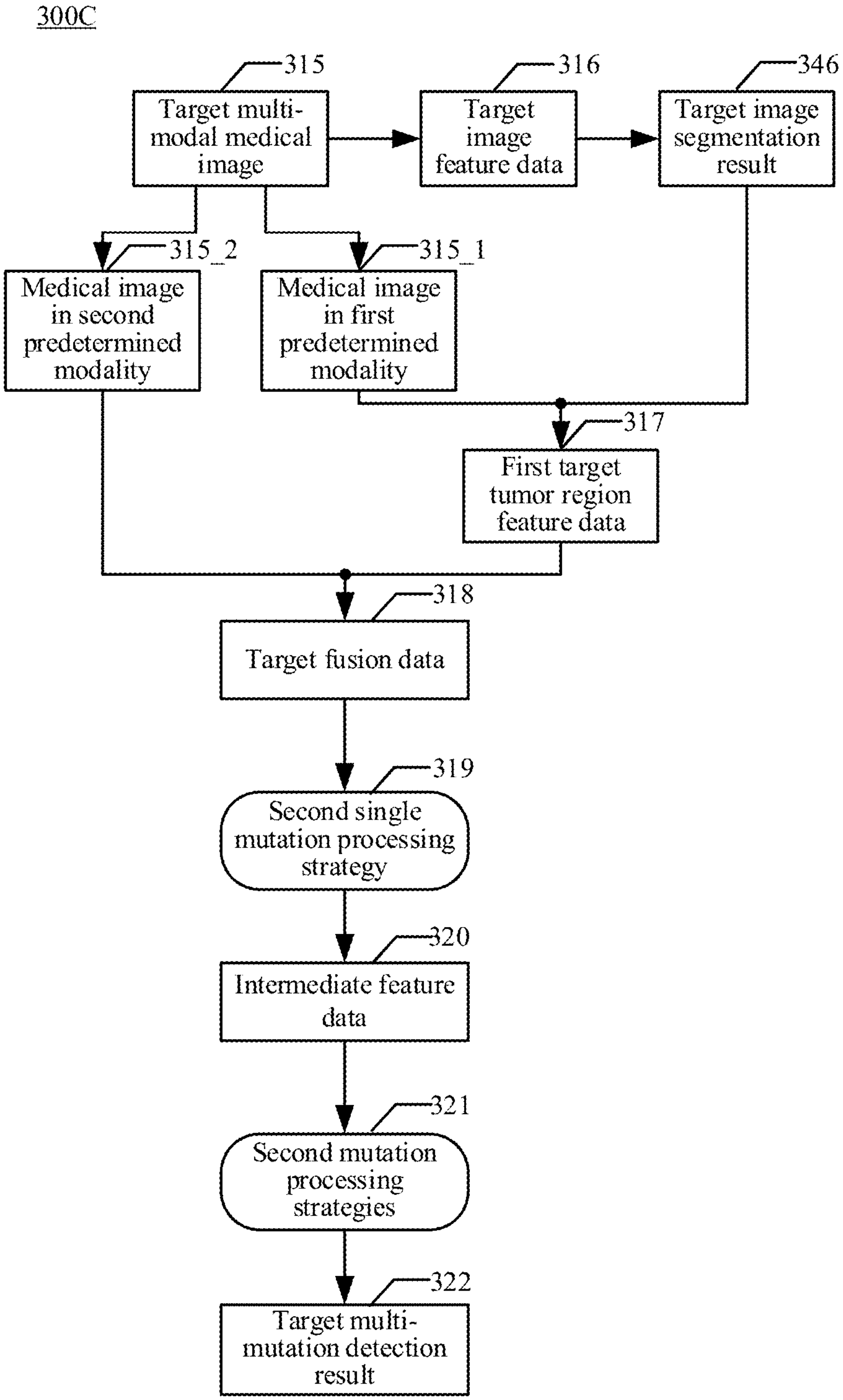
FIG. 3C schematically shows an example schematic diagram of the computer-implemented method according to other embodiments of the present disclosure.

FIG. 3C schematically shows an example schematic diagram of the computer-implemented method according to other embodiments of the present disclosure.

As shown in FIG. 3C, in 300C, target image feature data 316 in at least one scale is obtained according to a target multi-modal medical image 315 of the target part. A target image segmentation result 346 is obtained according to the target image feature data 316 in at least one scale. The target multi-modal medical image 315 may include a medical image 315_1 in a first predetermined modality and a medical image 315_2 in a second predetermined modality.

First target tumor region feature data 317 is obtained according to the target image segmentation result 346 and the medical image 315_1 in the first predetermined modality. Target fusion data 318 is obtained according to the first target tumor region feature data 317 and the medical image 315_2 in the second predetermined modality.

The target fusion data 318 is processed based on a second single mutation processing strategy 319 to obtain intermediate feature data 320.

The intermediate feature data 320 is processed based on each of a plurality of second mutation processing strategies 321, so as to obtain a plurality of target mutation detection results respectively corresponding to the plurality of second mutation processing strategies 321. A target multi-mutation detection result 322 is obtained according to the target mutation detection results respectively corresponding to the plurality of second mutation processing strategies 321.

Figure 3D:
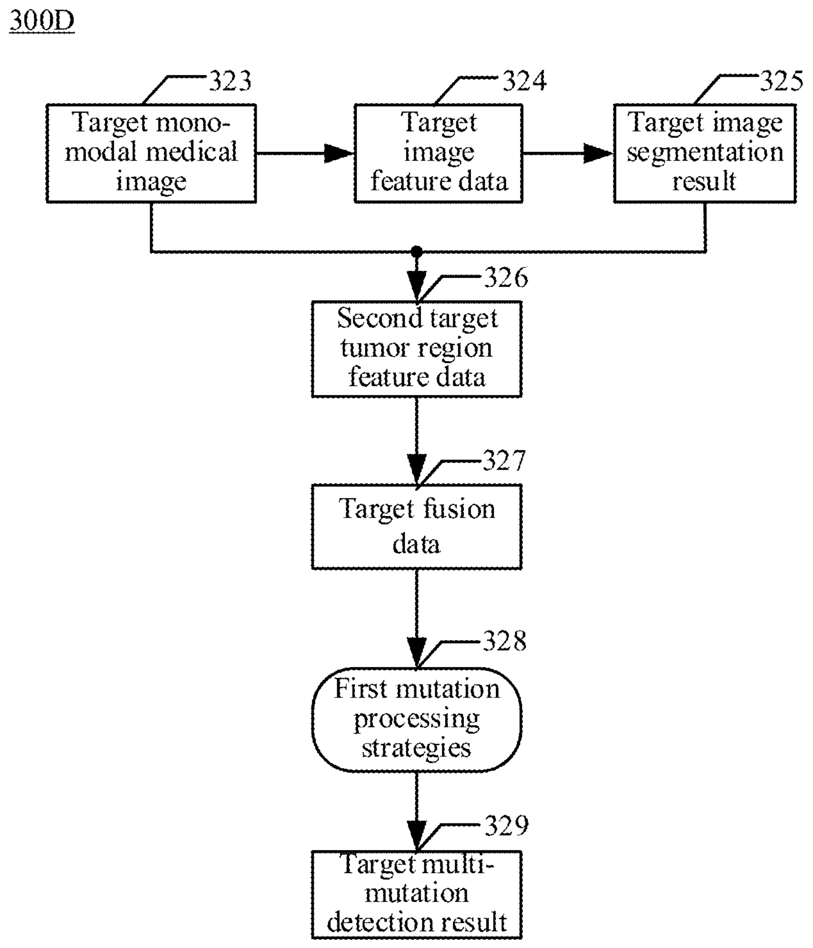
FIG. 3D schematically shows an example schematic diagram of the computer-implemented method according to other embodiments of the present disclosure.

FIG. 3D schematically shows an example schematic diagram of the computer-implemented method according to other embodiments of the present disclosure.

As shown in FIG. 3D, in 300D, target image feature data 324 in at least one scale is obtained according to a target mono-modal medical image 323 of the target part. A target image segmentation result 325 is obtained according to the target image feature data 324 in at least one scale.

Second target tumor region feature data 326 is obtained according to the target image segmentation result 325. The second target tumor region feature data 326 is determined as target fusion data 327.

The target fusion data 327 is processed based on each of a plurality of first mutation processing strategies 328, so as to obtain a plurality of target mutation detection results respectively corresponding to the plurality of first mutation processing strategies 328. A target multi-mutation detection result 329 is obtained according to the target mutation detection results respectively corresponding to the plurality of first mutation processing strategies 328.

Figure 3E:
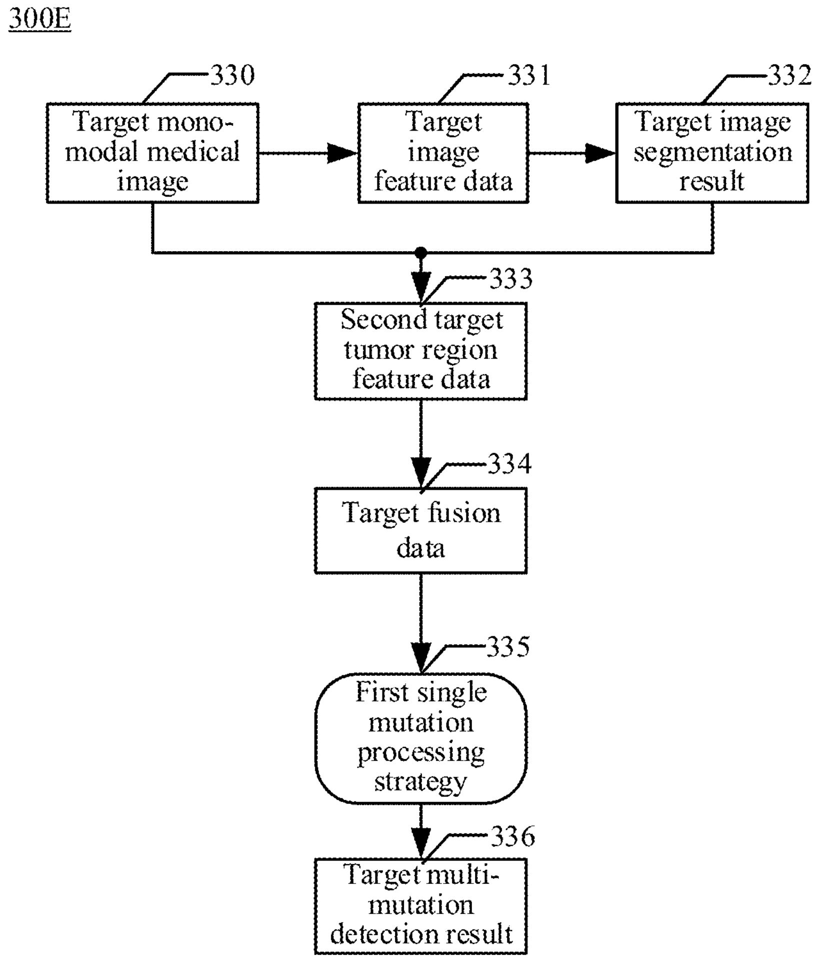
FIG. 3E schematically shows an example schematic diagram of the computer-implemented method according to other embodiments of the present disclosure.

FIG. 3E schematically shows an example schematic diagram of the computer-implemented method according to other embodiments of the present disclosure.

As shown in FIG. 3E, in 300E, target image feature data 331 in at least one scale is obtained according to a target mono-modal medical image 330 of the target part. A target image segmentation result 332 is obtained according to the target image feature data 331 in at least one scale.

Second target tumor region feature data 333 is obtained according to the target image segmentation result 332. The second target tumor region feature data 333 is determined as target fusion data 334.

The target fusion data 334 is processed based on a first single mutation processing strategy 335, so as to obtain a target multi-mutation detection result 336.

Figure 3F:
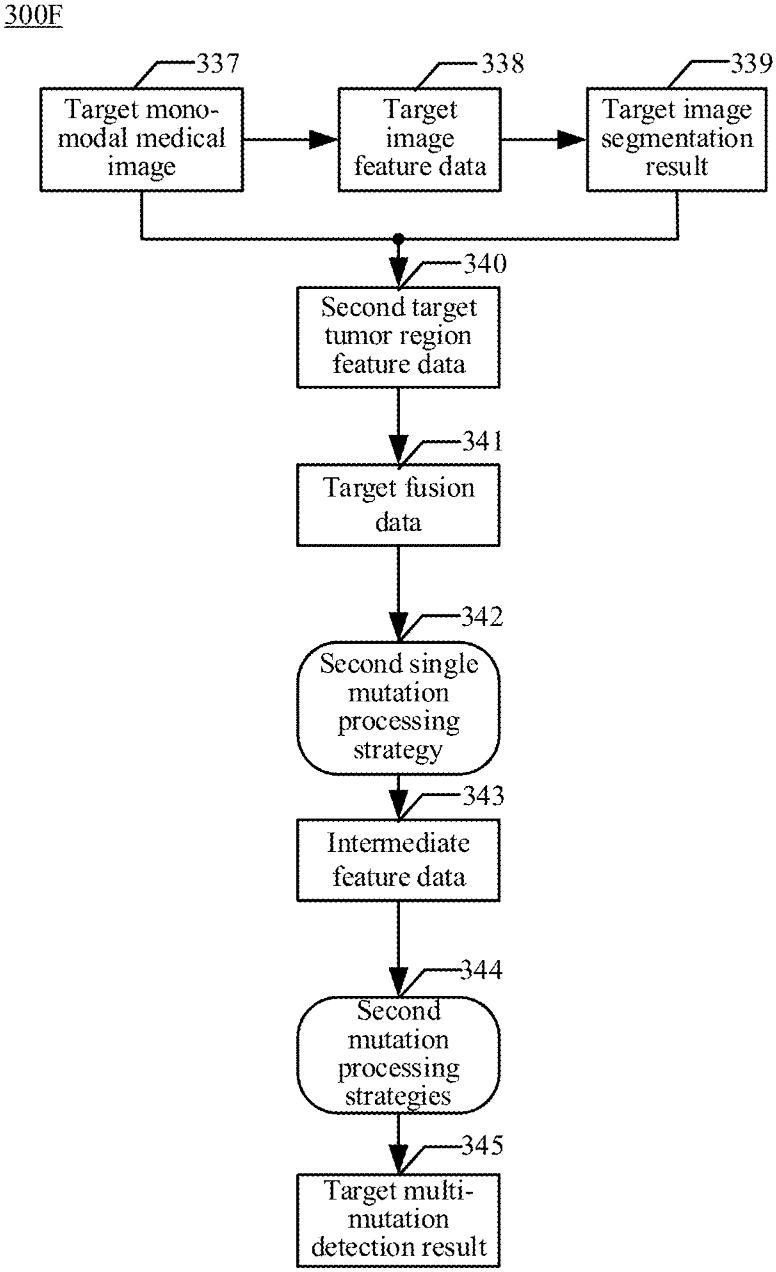
FIG. 3F schematically shows an example schematic diagram of the computer-implemented method according to other embodiments of the present disclosure.

FIG. 3F schematically shows an example schematic diagram of the computer-implemented method according to other embodiments of the present disclosure.

As shown in FIG. 3F, in 300F, target image feature data 338 in at least one scale is obtained according to a target mono-modal medical image 337 of the target part. A target image segmentation result 339 is obtained according to the target image feature data 338 in at least one scale.

Second target tumor region feature data 340 is obtained according to the target image segmentation result 339. The second target tumor region feature data 340 is determined as target fusion data 341.

The target fusion data 341 is processed based on a second single mutation processing strategy 342, so as to obtain intermediate feature data 343.

The intermediate feature data 343 is processed based on each of a plurality of second mutation processing strategies 344, so as to obtain a plurality of target mutation detection results respectively corresponding to the plurality of second mutation processing strategies 344. A target multi-mutation detection result 345 is obtained according to the target mutation detection results respectively corresponding to the plurality of second mutation processing strategies 344.

The computer-implemented method according to embodiments of the present disclosure will be further described with reference to FIG. 4A to FIG. 4D in conjunction with specific embodiments, with the target medical image being a target multi-modal MRI image, the target part being a brain, the target multi-mutation detection result including a target IDH mutation detection result, a target chromosome 1p/19q co-deletion mutation detection result, a target TERT mutation detection result and a target MGMT promoter methylation mutation detection result as an example.

Figure 4A:
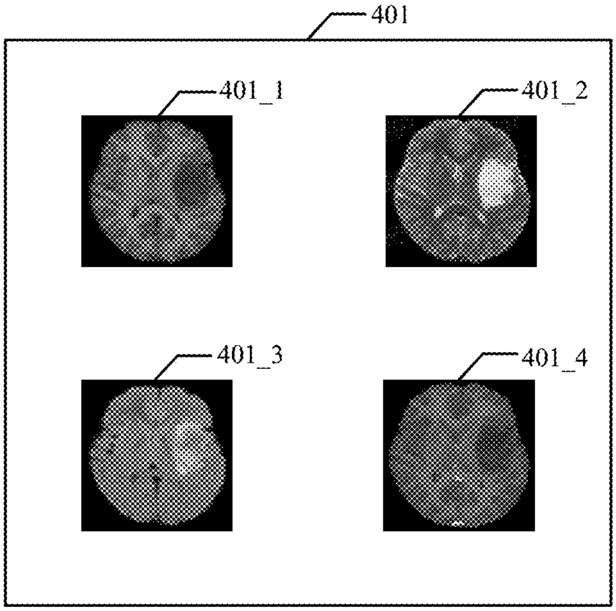
FIG. 4A schematically shows an example schematic diagram of a target multi-modal MRI image according to embodiments of the present disclosure.

FIG. 4A schematically shows an example schematic diagram of a target multi-modal MRI image according to embodiments of the present disclosure.

As shown in FIG. 4A, in 400A, a target multi-modal MRI image 401 may include a target image 401_1 in T1 modality, a target image 401_2 in T2 modality, a target image 401_3 in TICE modality, and a target image 401_4 in FLAIR modality.

Figure 4B:
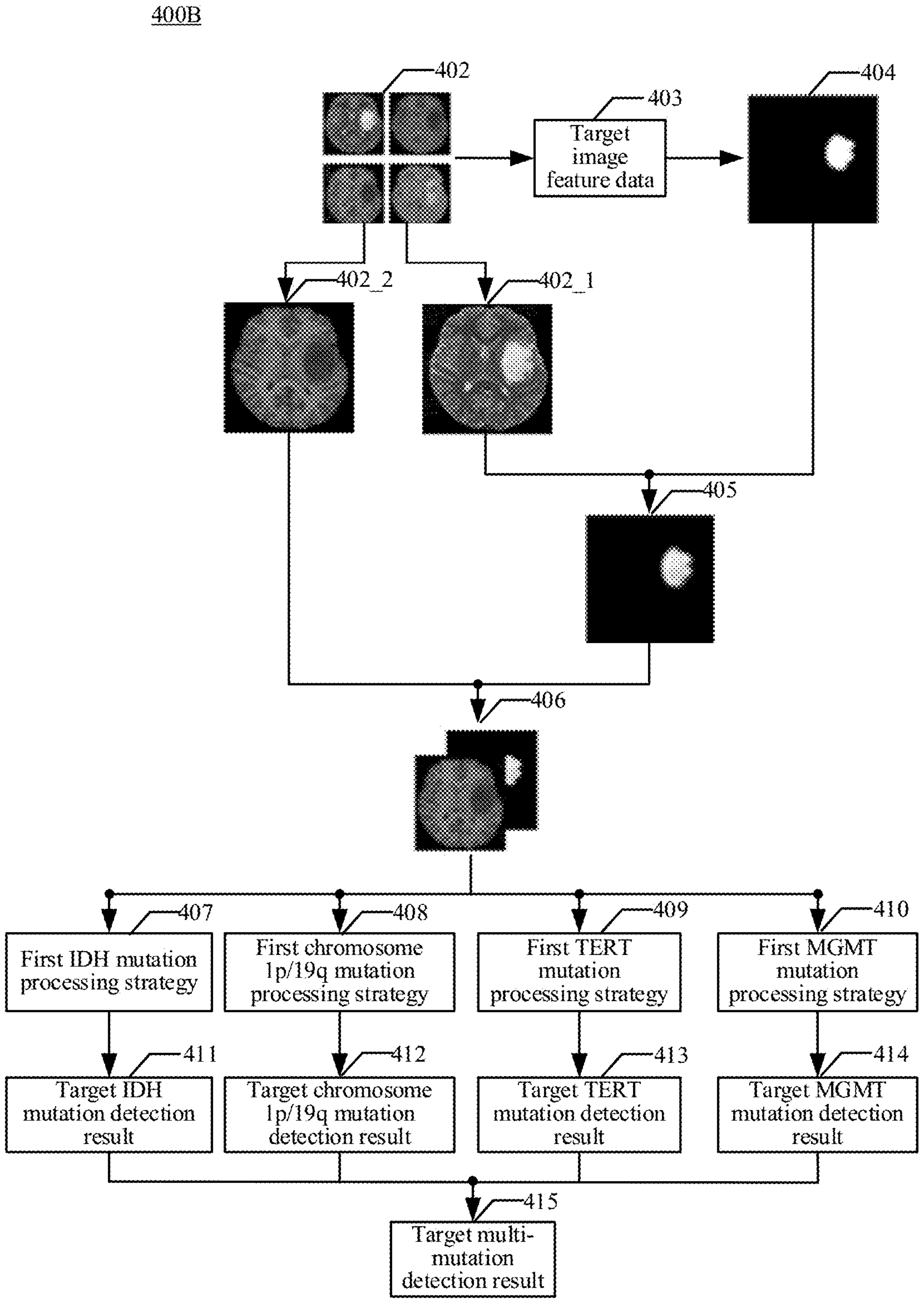
FIG. 4B schematically shows an example schematic diagram of the computer-implemented method according to embodiments of the present disclosure.

FIG. 4B schematically shows an example schematic diagram of the computer-implemented method according to embodiments of the present disclosure.

As shown in FIG. 4B, in 400B, target image feature data 403 in at least one scale is obtained according to a target multi-modal MRI image 402 of the target part. A target image segmentation result 404 is obtained according to the target image feature data 403 in at least one scale. The target multi-modal MRI image 402 may include a medical image 402_1 in T2 modality and a medical image 402_2 in T1 modality.

First target tumor region feature data 405 is obtained according to the target image segmentation result 404 and the image 402_1 in T2 modality. Target fusion data 406 is obtained according to the first target tumor region feature data 405 and the image 402_2 in T1 modality.

The target fusion data 406 is processed based on a first IDH mutation processing strategy 407 to obtain a target IDH mutation detection result 411. The target fusion data 406 is processed based on a first chromosome 1p/19q mutation processing strategy 408 to obtain a target chromosome 1p/19q mutation detection result 412. The target fusion data 406 is processed based on a first TERT mutation processing strategy 409 to obtain a target TERT mutation detection result 413. The target fusion data 406 is processed based on a first MGMT mutation processing strategy 410 to obtain a target MGMT mutation detection result 414.

A target multi-mutation detection result 415 is obtained according to the target IDH mutation detection result 411, the target chromosome 1p/19q mutation detection result 412, the target TERT mutation detection result 413, and the target MGMT mutation detection result 414.

Figure 4C:
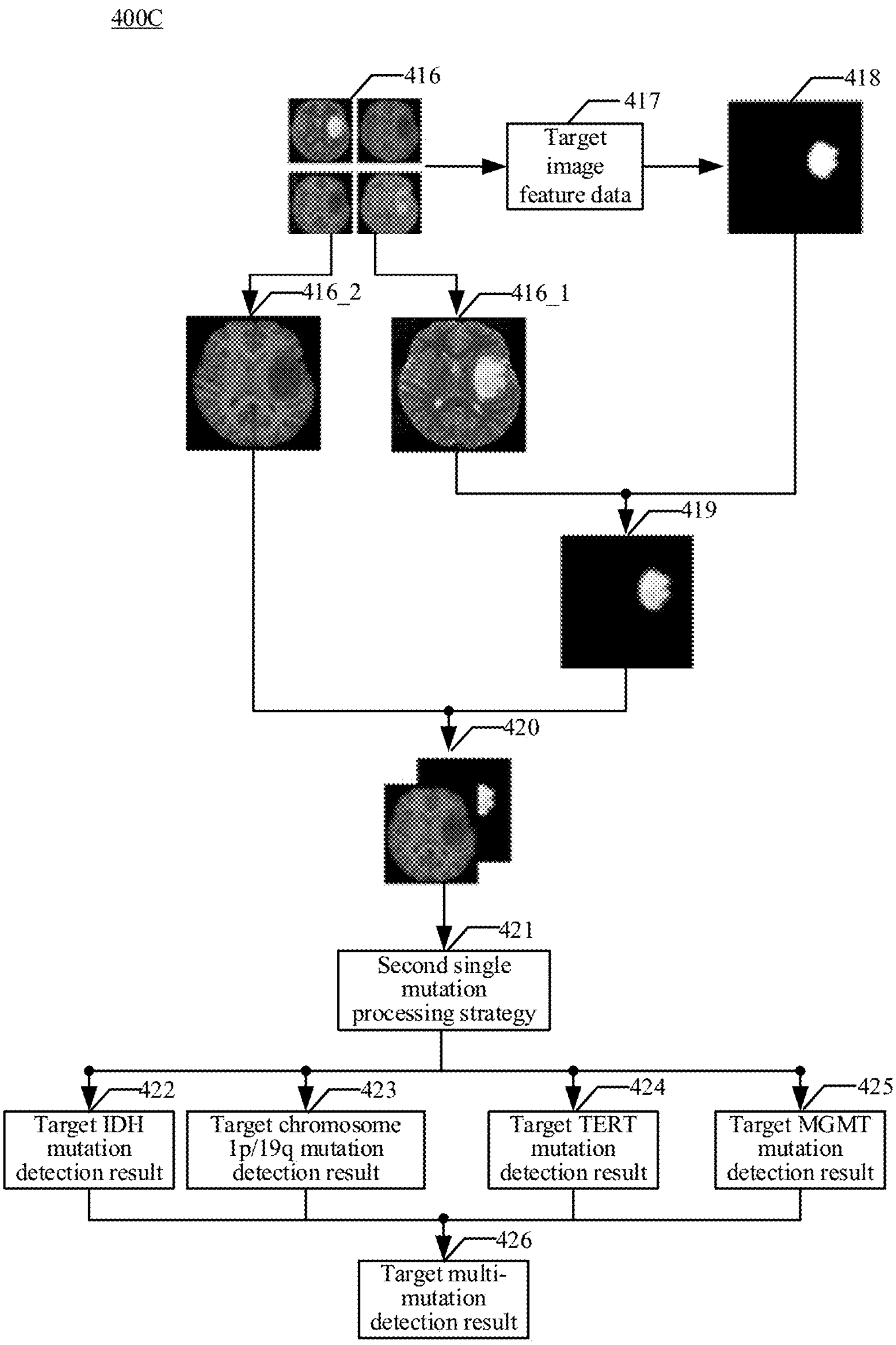
FIG. 4C schematically shows an example schematic diagram of the computer-implemented method according to other embodiments of the present disclosure.

FIG. 4C schematically shows an example schematic diagram of the computer-implemented method according to other embodiments of the present disclosure.

As shown in FIG. 4C, in 400C, target image feature data 417 in at least one scale is obtained according to a target multi-modal MRI image 416 of the target part. A target image segmentation result 418 is obtained according to the target image feature data 417 in at least one scale. The target multi-modal MRI image 416 may include a medical image 416_1 in T2 modality and a medical image 416_2 in T1 modality.

First target tumor region feature data 419 is obtained according to the target image segmentation result 418 and the image 416_1 in T2 modality. Target fusion data 420 is obtained according to the first target tumor region feature data 419 and the image 416_2 in T1 modality.

The target fusion data 420 is processed based on a first single mutation processing strategy 421, so as to obtain a target IDH mutation detection result 422, a target chromosome 1p/19q mutation detection result 423, a target TERT mutation detection result 424, and a target MGMT mutation detection result 425.

A target multi-mutation detection result 426 is obtained according to the target IDH mutation detection result 422, the target chromosome 1p/19q mutation detection result 423, the target TERT mutation detection result 424, and the target MGMT mutation detection result 425.

It should be noted that if IDH wild-type mutation and IDH mutant-type mutation are respectively represented by 0 and 1, chromosome 1p/19q non-deletion and chromosome 1p/19q co-deletion are respectively represented by 0 and 1, TERT wild-type mutation and TERT mutant-type mutation are respectively represented by 0 and 1, and MGMT promoter non-methylation and MGMT promoter methylation are respectively represented by 0 and 1, then the target multi-mutation detection result may include one of 0000, 0001, 0010, 0011, 1000, 1001, 1010, 1011, 1100, 1101, 1110, or 1111.

Figure 4D:
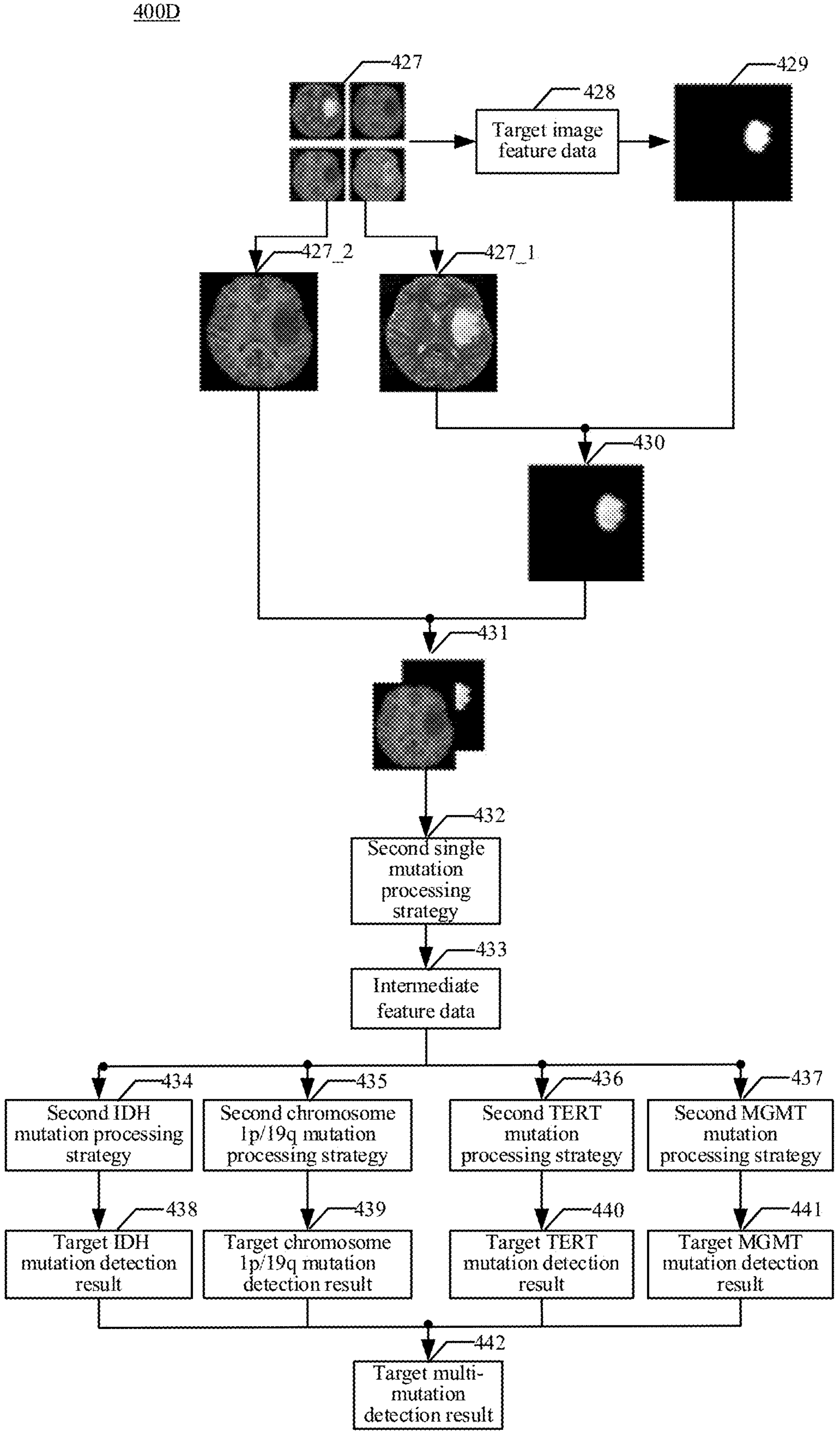
FIG. 4D schematically shows an example schematic diagram of the computer-implemented method according to other embodiments of the present disclosure.

FIG. 4D schematically shows an example schematic diagram of the computer-implemented method according to other embodiments of the present disclosure.

As shown in FIG. 4D, in 400D, target image feature data 428 in at least one scale is obtained according to a target multi-modal MRI image 427 of the target part. A target image segmentation result 429 is obtained according to the target image feature data 428 in at least one scale. The target multi-modal MRI image 427 may include a medical image 427_1 in T2 modality and a medical image 427_2 in T1 modality.

First target tumor region feature data 430 is obtained according to the target image segmentation result 429 and the images 427_1 in T2 modality. Target fusion data 431 is obtained according to the first target tumor region feature data 430 and the image 427_2 in T1 modality.

The target fusion data 431 is processed based on a second single mutation processing strategy 432, so as to obtain intermediate feature data 433.

The intermediate feature data 433 is processed based on a second IDH mutation processing strategy 434 to obtain a target IDH mutation detection result 438. The intermediate feature data 433 is processed based on a second chromosome 1p/19q mutation processing strategy 435 to obtain a target chromosome 1p/19q mutation detection result 439. The intermediate feature data 433 is processed based on a second TERT mutation processing strategy 436 to obtain a target TERT mutation detection result 440. The intermediate feature data 433 is processed based on a second MGMT mutation processing strategy 437 to obtain a target MGMT mutation detection result 441.

A target multi-mutation detection result 442 is obtained according to the target IDH mutation detection result 438, the target chromosome 1p/19q mutation detection result 439, the target TERT mutation detection result 440, and the target MGMT mutation detection result 441.

Figure 5:
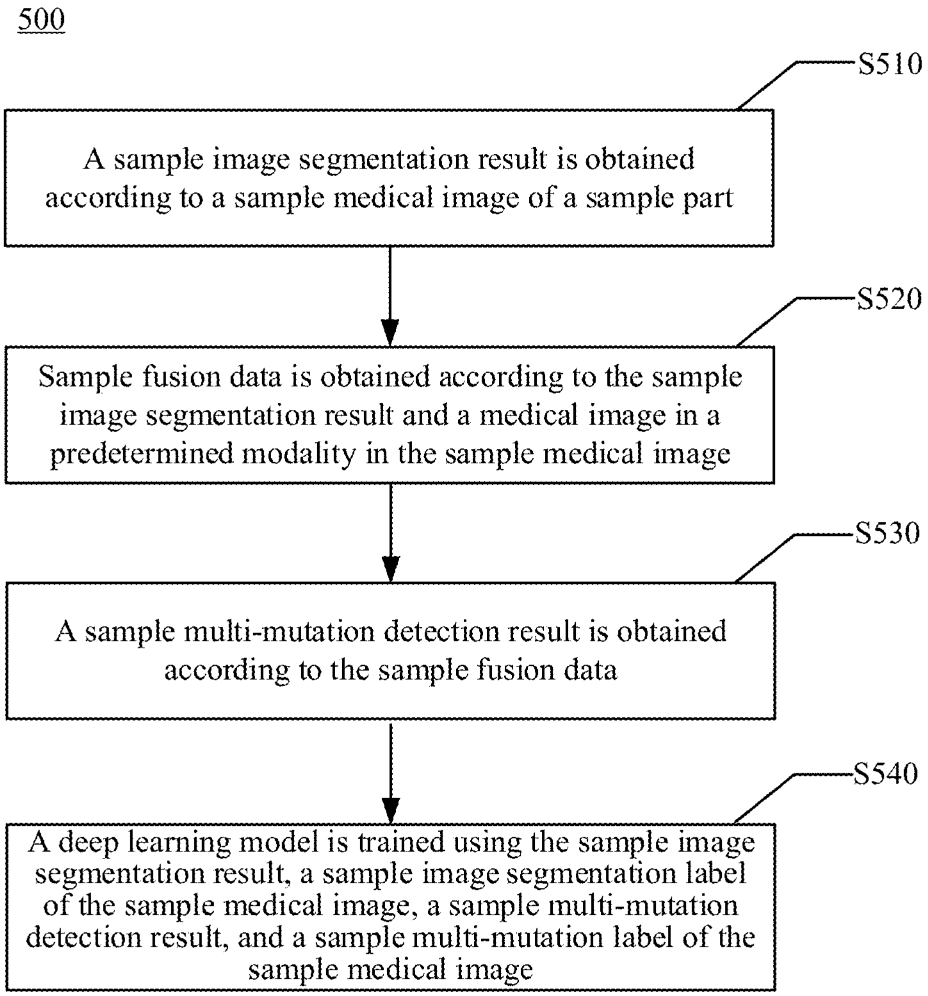
FIG. 5 schematically shows a flowchart of a method of training a deep learning model according to embodiments of the present disclosure.

FIG. 5 schematically shows a flowchart of a method of training a deep learning model according to embodiments of the present disclosure.

As shown in FIG. 5, a method 500 includes operations S510 to S540.

In operation S510, a sample image segmentation result is obtained according to a sample medical image of a sample part.

In operation S520, sample fusion data is obtained according to the sample image segmentation result and a medical image in a predetermined modality in the sample medical image.

In operation S530, a sample multi-mutation detection result is obtained according to the sample fusion data.

In operation S540, a deep learning model is trained using the sample image segmentation result, a sample image segmentation label of the sample medical image, a sample multi-mutation detection result, and a sample multi-mutation label of the sample medical image.

According to embodiments of the present disclosure, the sample image segmentation label may refer to a true segmentation result of the sample medical image, and the sample multi-mutation label may refer to a true multi-mutation result of the sample medical image.

According to embodiments of the present disclosure, based on a loss function, an output value may be obtained according to the sample image segmentation result, the sample image segmentation label of the sample medical image, the sample multi-mutation detection result, and the sample multi-mutation label of the sample medical image. A model parameter of the deep learning model is adjusted according to the output value, so as to obtain a target detection model for performing a multi-mutation detection.

According to embodiments of the present disclosure, for descriptions of the sample part, the sample medical image, the sample image segmentation result, the sample fusion data and the sample multi-mutation detection result, reference may be made to related contents on the target part, the target medical image, the target image segmentation result, the target fusion data and the target multi-mutation detection result mentioned above, and details will not be repeated here.

According to embodiments of the present disclosure, the deep learning model is trained using the sample image segmentation result, the sample image segmentation label of the sample medical image, the sample multi-mutation detection result and the sample multi-mutation label of the sample medical image, so that a joint training of the image segmentation and the multi-mutation detection is achieved. Moreover, by detecting multiple gene mutations, a mutual influence between mutations may be utilized, so that a prediction accuracy of the deep learning model may be improved.

According to embodiments of the present disclosure, the sample medical image may include a medical image in at least one modality.

According to embodiments of the present disclosure, operation S540 may include the following operations.

A first output value is obtained based on a first loss function according to the sample image segmentation result and the sample image segmentation label of the sample medical image. A second output value is obtained based on a second loss function according to the sample multi-mutation detection result and the sample multi-mutation label of the sample medical image. The model parameter of the deep learning model is adjusted according to the output value.

According to embodiments of the present disclosure, the output value may be determined according to the first output value and the second output value.

According to embodiments of the present disclosure, the first loss function may refer to a loss function used to perform an image segmentation. A form of the first loss function may be determined according to the actual service needs and is not limited here. For example, the first loss function may include a similarity loss function. The similarity loss function may include a DICE loss function.

According to embodiments of the present disclosure, the second loss function may refer to a loss function used to perform a mutation detection. A form of the second loss function may be determined according to the actual service needs and is not limited here. For example, the second loss function may include a cross entropy loss function.

According to embodiments of the present disclosure, the sample image segmentation result and the sample image segmentation label of the sample medical image may be input into the first loss function to obtain the first output value. The sample multi-mutation detection result and the sample multi-mutation label of the sample medical image may be input into the second loss function to obtain the second output value. Each mutation category may have the second loss function corresponding to the gene mutation of that category. Alternatively, each mutation category has the same second loss function.

According to embodiments of the present disclosure, the first loss function may be determined according to Equation (1).

$$L_1 = 1 - \frac{2}{N}\sum_{n=1}^{N}\frac{\sum_{i=1}^{I}(p_{ni}\times g_{ni})}{\sum_{i=1}^{I}p_{ni}^2+\sum_{i=1}^{I}g_{ni}^2} \tag{1}$$

According to embodiments of the present disclosure, $L_1$ may represent the first loss function, $p_{ni}$ may represent the sample image segmentation result for an $n^{th}$ segmentation category for an $i^{th}$ sample medical image block of the sample medical image, $g_{ni}$ may represent the sample image segmentation label for the $n^{th}$ segmentation category for the $i^{th}$ sample medical image block of the sample medical image, N may represent the number of segmented categories, and I may represent the number of sample medical image blocks included in each sample medical image. N may be an integer greater than or equal to 1, and I may be an integer greater than or equal to 1. $n\in\{1, 2, \ldots, N-1, N\}$, $i\in\{1, 2, \ldots, I-1, I\}$.

According to embodiments of the present disclosure, the second loss function may be determined according to Equation (2) and Equation (3).

$$L_2 = \sum_{m=1}^{M} L_{2m} \tag{2}$$

$$L_{2m} = -[y_m \log y'_m + (1-y_m)\log(1-y'_m)] \tag{3}$$

According to embodiments of the present disclosure, $L_2$ may represent the second loss function, $L_{2m}$ may represent the second loss function corresponding to an $m^{th}$ mutation category, $y'_m$ may represent the sample mutation detection result for the $m^{th}$ mutation category of the sample medical image, $y_m$ may represent the sample mutation label for the $m^{th}$ mutation category of the sample medical image, and M may represent the number of mutation categories. M may be an integer greater than or equal to 1. $m\in\{1, 2, \ldots, M-1, M\}$.

According to embodiments of the present disclosure, the second loss function may be determined according to Equation (4).

$$L_2 = -\sum_{m=1}^{M} w_m y_m \log y'_m \tag{4}$$

According to embodiments of the present disclosure, $L_2$ may represent the second loss function, $w_m$ may represent a weight of the $m^{th}$ mutation category corresponding to the sample medical image. $y'_m$ may represent the sample multi-mutation detection result for the $m^{th}$ mutation category of the sample medical image, $y_m$ may represent the sample multi-mutation label for the $m^{th}$ mutation category of the sample medical image, and M may represent the number of mutation categories. $m\in\{1, 2, \ldots, M-1, M\}$.

According to embodiments of the present disclosure, the loss function may be determined according to Equation (5).

$$L = \alpha L_1 + (1-\alpha)L_2 \tag{5}$$

According to embodiments of the present disclosure, L may represent the loss function, and $\alpha$ may represent a first predetermined parameter. $\alpha$ may be determined according to actual service needs and is not limited here.

According to embodiments of the present disclosure, operation S530 may include the following operations.

The sample fusion data is processed based on each of a plurality of first mutation processing strategies, so as to obtain a plurality of sample mutation detection results respectively corresponding to the plurality of first mutation processing strategies. The sample multi-mutation detection result is obtained according to the sample mutation detection results respectively corresponding to the plurality of first mutation processing strategies.

According to embodiments of the present disclosure, the output value may be determined according to the first output value, the second output value, and a third output value.

According to embodiments of the present disclosure, the method of training the deep learning model may further include the following operations.

The third output value is obtained based on a third loss function according to a sample mutation detection result corresponding to a predetermined mutation processing strategy and a sample mutation label.

According to embodiments of the present disclosures, the predetermined mutation processing strategy may refer to a mutation processing strategy with a conflicting relationship. For example, for the sample IDH mutation detection result and the sample chromosome 1p/19q co-deletion detection result, the sample multi-mutation detection result does not include a sample IDH mutant-type detection result and a sample chromosome 1p/19q no-deletion since a 1p/19q co-deletion occurs in a case of IDH mutation.

According to embodiments of the present disclosure, the sample mutation detection result corresponding to the predetermined mutation processing strategy and the sample mutation label may be input into the third loss function to obtain the third output value.

According to embodiments of the present disclosure, the third loss function may be determined according to Equation (6).

$$L_3 = \beta(L_{2s} \times L_{2q}) \quad (6)$$

According to embodiments of the present disclosure, $L_3$ may represent the third loss function, and β may represent a second predetermined parameter. β may be determined according to actual service needs and is not limited here. For example, β=10. $L_{2s}$ may represent the second loss function corresponding to an $s^{th}$ mutation category, $L_{2q}$ may represent the second loss function corresponding to a $q^{th}$ mutation category. s≠q. $L_{2s}$ and $L_{2q}$ may be determined according to Equation (3).

According to embodiments of the present disclosure, the loss function may be determined according to Equation (7).

$$L = \alpha L_1 + (1-\alpha)L_2 + L_3 \quad (7)$$

According to embodiments of the present disclosure, L may represent the loss function.

According to embodiments of the present disclosure, the prediction accuracy of the deep learning model is improved by increasing an impact of the sample mutation detection result corresponding to the predetermined mutation processing strategy on the model parameter of the deep learning model.

According to embodiments of the present disclosure, operation S530 may include the following operations.

The sample fusion data is processed based on the first single mutation processing strategy, so as to obtain the sample multi-mutation detection result.

According to embodiments of the present disclosure, operation S530 may include the following operations.

The sample fusion data is processed based on the second single mutation processing strategy to obtain intermediate sample feature data. The intermediate sample feature data is processed based on each of a plurality of second mutation processing strategies, so as to obtain a plurality of sample mutation detection results respectively corresponding to the plurality of second mutation processing strategies. The sample multi-mutation detection result is obtained according to the sample mutation detection results respectively corresponding to the plurality of second mutation processing strategies.

According to embodiments of the present disclosure, operation S510 may include the following operations.

Sample image feature data in at least one scale is obtained according to the sample medical image of the sample part. The sample image segmentation result is obtained according to the sample image feature data in at least one scale.

According to embodiments of the present disclosure, the at least one scale may include J scales.

According to embodiments of the present disclosure, obtaining the sample image segmentation result according to the sample image feature data in at least one scale may include the following operations.

In a case of 1≤j<J, $j^{th}$-scale fusion image feature data is obtained according to $j^{th}$-scale sample image feature data and $j^{th}$-scale up-sampling image feature data.

The sample image segmentation result is obtained according to $1^{st}$-scale fusion image feature data.

According to embodiments of the present disclosure, J may be an integer greater than or equal to 1. The $j^{th}$-scale up-sampling image feature data may be obtained according to $(j+1)^{th}$-scale sample image feature data and $(j+1)^{th}$-scale up-sampling image feature data. The $j^{th}$-scale sample image feature data may be obtained according to $(j-1)^{th}$-scale sample image feature data. j may be an integer greater than or equal to 1 and less than or equal to J.

According to embodiments of the present disclosure, the at least one scale may include K scales.

According to embodiments of the present disclosure, obtaining the sample image segmentation result according to the sample image feature data in at least one scale may include the following operations.

In a case of 1≤k<K, $k^{th}$-scale fusion image feature data is obtained according to $k^{th}$-scale sample image feature data, $(k-1)^{th}$-scale sample image feature data, $(k+1)^{th}$-scale sample image feature data, and $k^{th}$-scale up-sampling image feature data.

The sample image segmentation result is obtained according to $1^{st}$-scale fusion image feature data.

According to embodiments of the present disclosure, K may be an integer greater than or equal to 1. The $k^{th}$-scale up-sampling image feature data may be obtained according to the $(k+1)^{th}$-scale sample image feature data, the $k^{th}$-scale sample image feature data, $(k+2)^{th}$-scale sample image feature data, and $(k+1)^{th}$-scale up-sampling image feature data. The $k^{th}$-scale sample image feature data may be obtained according to the $(k-1)^{th}$-scale sample image feature data. k may be an integer greater than or equal to 1 and less than or equal to K.

According to embodiments of the present disclosure, the method of training the deep learning model may further include the following operations.

An original sample medical image is pre-processed to obtain the sample medical image.

According to embodiments of the present disclosures, pre-processing may include at least one of image clipping, re-sampling, or data normalization. The data normalization may include a zero-mean normalization. The original sample medical image may include a medical image in at least one modality. An image clipping may be performed on the original sample medical image to obtain the sample medical image containing a sample tissue of the sample part. For example, a second bounding box corresponding to the at least one modality may be determined according to the medical image in the at least one modality included in the original sample medical image, so as to obtain at least one second bounding box. A union region of the at least one second bounding box may be determined to obtain a second target bounding box. An image clipping may be performed on the medical image in the at least one modality included in the original sample medical image by using the second target bounding box, so as to obtain the sample medical image. For example, a pixel value of a region where the second target bounding box is located in the original sample medical image may be set as a first predetermined pixel value, and a pixel value of a region outside the second target bounding box in the original sample medical image may be set as a second predetermined pixel value. In addition, a data normalization may be performed on the original sample medical image to obtain the sample medical image.

According to embodiments of the present disclosure, a re-sampling may be performed on the original sample medical image to obtain the sample medical image. In a case of a plurality of sample medical images, volume pixels of the plurality of sample medical images represent a consistent actual physical space.

According to embodiments of the present disclosures, the original sample medical image may include a medical image in at least one modality. An image clipping may be performed on the original sample medical image to obtain a first intermediate sample medical image. A data normalization may be performed on the first intermediate sample medical image to obtain the sample medical image.

According to embodiments of the present disclosure, an image clipping may be performed on the original sample medical image to obtain a second intermediate sample medical image. A re-sampling may be performed on the second intermediate sample medical image to obtain a third intermediate sample medical image. A data normalization may be performed on the third intermediate sample medical image to obtain the sample medical image.

According to embodiments of the present disclosure, the sample part may include a brain. The sample multi-mutation detection result may include at least two selected from: a sample Isocitrate: NAD+Oxidoreductase (Decarboxylating) mutation detection result, a sample chromosome 1p/19q co-deletion mutation detection result, a sample Telomerase Reverse Tranase mutation detection result, or a sample 06-Methylguanine-DNA Methyltransferase promoter methylation mutation detection result.

In technical solutions of the present disclosure, a collection, a storage, a use, a processing, a transmission, a provision, a disclosure and other processing of user personal information involved comply with provisions of relevant laws and regulations, and do not violate public order and good custom.

The above are merely exemplary embodiments. The present disclosure is not limited to thereto, and may further include other computer-implemented methods and other methods of training a deep learning model known in the art, as long as the accuracy of the target multi-mutation detection result and the target image segmentation result may be improved.

Figure 6:
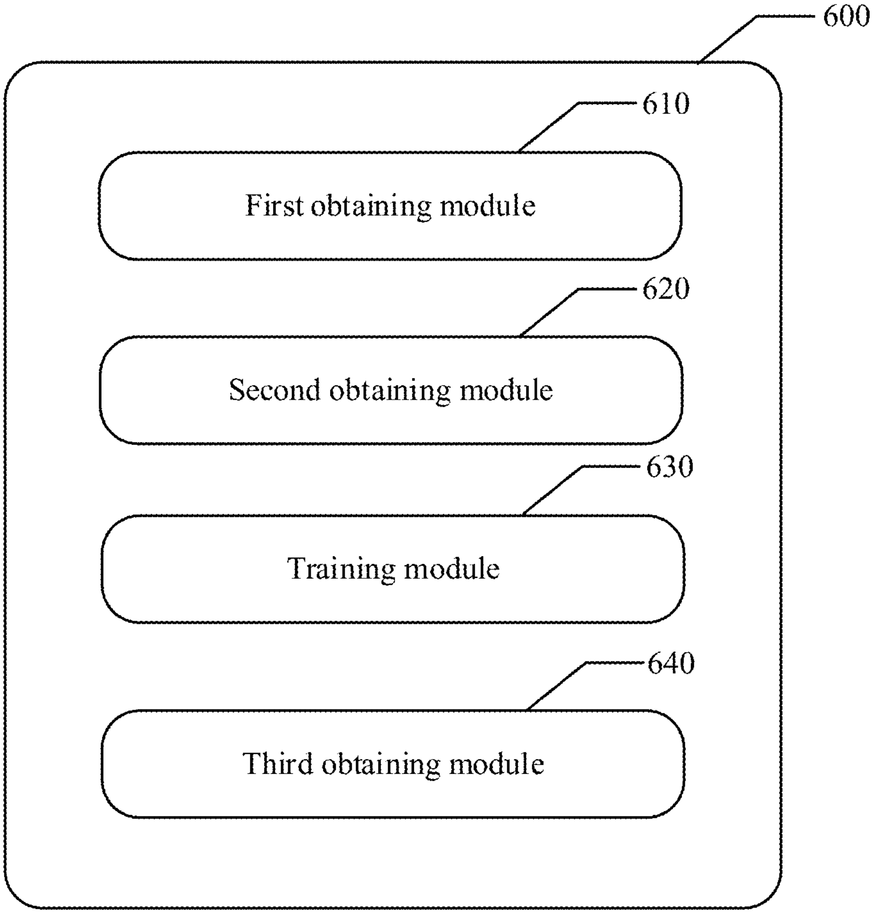
FIG. 6 schematically shows a block diagram of an apparatus according to embodiments of the present disclosure.

FIG. 6 schematically shows a block diagram of an apparatus according to embodiments of the present disclosure.

As shown in FIG. 6, an apparatus 600 may include a first obtaining module 610, a second obtaining module 620, and a third module 630.

The first obtaining module 610 is used to obtain a target image segmentation result according to a target medical image of a target part. The target medical image includes a medical image in at least one modality.

The second obtaining module 620 is used to obtain target fusion data according to the target medical image segmentation result and a medical image in a predetermined modality in the target medical image.

The third obtaining module 630 is used to obtain a target multi-mutation detection result according to the target fusion data.

According to embodiments of the present disclosure, the target medical image includes a target multi-modal medical image, and the target multi-modal medical image includes a medical image in a plurality of modalities.

According to embodiments of the present disclosure, the second obtaining module 620 may include a first obtaining sub-module and a second obtaining sub-module.

The first obtaining sub-module is used to obtain first target tumor region feature data according to the target image segmentation result and a medical image in a first predetermined modality in the target multi-modal medical image.

The second obtaining sub-module is used to obtain the target fusion data according to the first target tumor region feature data and a medical image in a second predetermined modality in the target multi-modal medical image.

According to embodiments of the present disclosure, the target multi-modal magnetic resonance image, the medial image in the first predetermined modality includes an image in T2 modality, and the medical image in the second predetermined modality includes an image in T1 modality.

According to embodiments of the present disclosure, the target medical image includes a target mono-modal medical image, and the target mono-modal medical image includes a medical image in a single modality.

According to embodiments of the present disclosure, the second obtaining module 620 may include a third obtaining sub-module and a fourth obtaining sub-module.

The third obtaining sub-module is used to obtain second target tumor region feature data according to the target image segmentation result and the target mono-modal medical image.

The fourth obtaining sub-module is used to determine the second target tumor region feature data as the target fusion data.

According to embodiments of the present disclosure, the second obtaining module 630 may include a fifth obtaining sub-module and a sixth obtaining sub-module.

The fifth obtaining sub-module is used to process the target fusion data based on each of a plurality of first mutation processing strategies, so as to obtain a plurality of target mutation detection results respectively corresponding to the plurality of first mutation processing strategies.

The sixth obtaining sub-module is used to obtain the target multi-mutation detection result according to the plurality of target mutation detection results respectively corresponding to the plurality of first mutation processing strategies.

According to embodiments of the present disclosure, the third obtaining module 630 may include a seventh obtaining sub-module.

The seventh obtaining sub-module is used to process the target fusion data based on a first single mutation processing strategy to obtain the target multi-mutation detection result.

According to embodiments of the present disclosure, the third obtaining module 630 may include a seventh obtaining sub-module, an eighth obtaining sub-module, and a ninth obtaining sub-module.

The seventh obtaining sub-module is used to process the target fusion data based on a second single mutation processing strategy to obtain intermediate feature data.

The eighth obtaining sub-module is used to process the intermediate feature data based on each of a plurality of second mutation processing strategies, so as to obtain a plurality of target mutation detection results respectively corresponding to the plurality of second mutation processing strategies.

The ninth obtaining sub-module is used to obtain the target multi-mutation detection result according to the plurality of target mutation detection results respectively corresponding to the plurality of second mutation processing strategies.

According to embodiments of the present disclosure, the first obtaining module 610 may include a tenth obtaining sub-module and an eleventh obtaining sub-module.

The tenth obtaining sub-module is used to obtain target image feature data in at least one scale according to the target medical image of the target part.

The eleventh obtaining sub-module is used to obtain the target image segmentation result according to the target image feature data in at least one scale.

According to embodiments of the present disclosure, the at least one scale includes J scales, and J is an integer greater than or equal to 1.

According to embodiments of the present disclosure, the eleventh obtaining sub-module may include a first obtaining unit and a second obtaining unit.

The first obtaining unit is used to, for $1 \le j < J$, obtain $j^{th}$-scale fusion image feature data according to $j^{th}$-scale target image feature data and $j^{th}$-scale up-sampling image feature data. The $j^{th}$-scale up-sampling image feature data is obtained according to $(j+1)^{th}$-scale target image feature data and $(j+1)^{th}$-scale up-sampling image feature data. The $j^{th}$-scale target image feature data is obtained according to $(j-1)^{th}$-scale target image feature data. j is an integer greater than or equal to 1 and less than or equal to J.

The second obtaining unit is used to obtain the target image segmentation result according to $1^{st}$-scale fusion image feature data.

According to embodiments of the present disclosure, the at least one scale includes K scales, and K is an integer greater than or equal to 1.

According to embodiments of the present disclosure, the eleventh obtaining sub-module may include a third obtaining unit and a fourth obtaining unit.

The third obtaining unit is used to, for $1 \le k < K$, obtain $k^{th}$-scale fusion image feature data according to $k^{th}$-scale target image feature data, $(k-1)^{th}$-scale target image feature data, $(k+1)^{th}$ scale target image feature data, and $k^{th}$-scale up-sampling image feature data. The $k^{th}$-scale up-sampling image feature data is obtained according to the $(k+1)^{th}$-scale target image feature data, the $k^{th}$-scale target image feature data, $(k+2)^{th}$-scale target image feature data and $(k+1)^{th}$-scale up-sampling image feature data. The $k^{th}$-scale target image feature data is obtained according to the $(k-1)^{th}$-scale target image feature data. k is an integer greater than or equal to 1 and less than or equal to K.

The seventh obtaining unit is used to obtain the target image segmentation result according to $1^{st}$-scale fusion image feature data.

According to embodiments of the present disclosure, the apparatus 600 may further include a fourth obtaining module.

The fourth obtaining module is used to pre-process an original medical image to obtain the target medical image.

According to embodiments of the present disclosure, the target part includes a brain. The target multi-mutation detection result includes at least two selected from: a target isocitrate dehydrogenase mutation detection result, a target chromosome 1p/19q co-deletion mutation detection result, a target telomerase reverse tranase mutation detection result, or a target 06-methylguanine-DNA methyltransferase promoter methylation mutation detection result.

Figure 7:
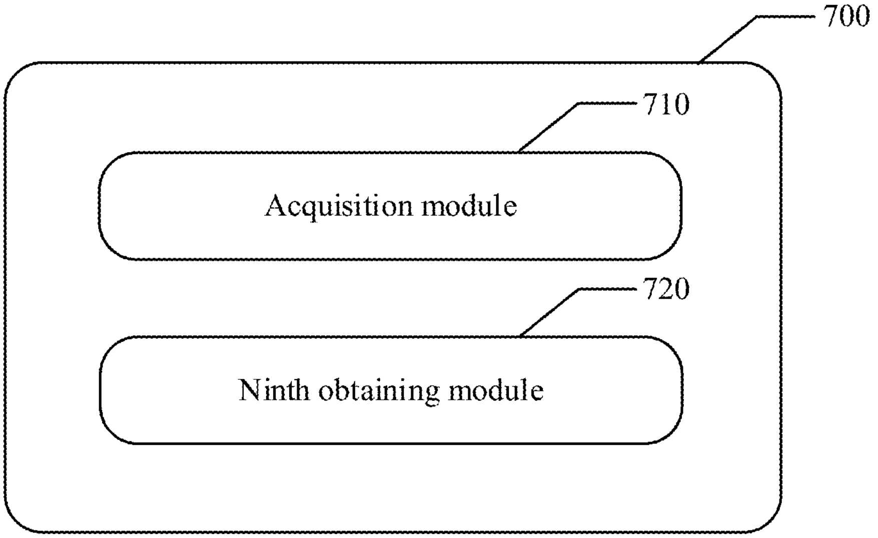
FIG. 7 schematically shows a block diagram of an apparatus of training a deep learning model according to embodiments of the present disclosure.

FIG. 7 schematically shows a block diagram of an apparatus of training a deep learning model according to embodiments of the present disclosure.

As shown in FIG. 7, an apparatus 700 of training a deep learning model may include a fifth obtaining module 710, a sixth obtaining module 720, a seventh obtaining module 730, and a training module 740.

The fourth obtaining module 710 is used to obtain a sample image segmentation result according to a sample medical image of a sample part. The sample medical image includes a medical image in at least one modality.

The fifth obtaining module 720 is used to obtain sample fusion data according to the sample image segmentation result and a medical image in a predetermined modality in the sample multi-modal medical image.

The sixth obtaining module 730 is used to obtain a sample multi-mutation detection result according to the sample fusion data.

The training module 740 is used to train the deep learning model by using the sample image segmentation result, a sample image segmentation label of the sample medical image, the sample multi-mutation detection result, and a sample multi-mutation label of the sample medical image.

According to embodiments of the present disclosure, the training module 740 may include a twelfth obtaining sub-module, a thirteenth obtaining sub-module, and an adjustment sub-module.

The twelfth obtaining sub-module is used to obtain a first output value based on a first loss function according to the sample image segmentation result and the sample image segmentation label of the sample medical image.

The thirteenth obtaining sub-module is used to obtain a second output value based on a second loss function according to the sample multi-mutation detection result and the sample multi-mutation label of the sample medical image.

The adjustment sub-module is used to adjust a model parameter of the deep learning model according to an output value. The output value is determined according to the first output value and the second output value.

According to embodiments of the present disclosure, the sixth obtaining module 730 may include a fourteenth obtaining sub-module and a fifteenth obtaining sub-module.

The fourteenth obtaining sub-module is used to process the sample fusion data based on each of a plurality of first mutation processing strategies, so as to obtain a plurality of sample mutation detection results respectively corresponding to the plurality of first mutation processing strategies.

The fifteenth obtaining sub-module is used to obtain the sample multi-mutation detection result according to the plurality of sample mutation detection results respectively corresponding to the plurality of first mutation processing strategies.

According to embodiments of the present disclosure, the output value is determined according to the first output value, the second output value, and a third output value.

According to embodiments of the present disclosure, the apparatus 700 of training the deep learning module may further include an eighth obtaining module.

The eighth obtaining module is used to obtain the third output value based on a third loss function according to a sample mutation detection result corresponding to a predetermined mutation processing strategy and a sample mutation label.

According to embodiments of the present disclosure, the sixth obtaining module 730 may include a sixteenth obtaining sub-module.

The sixteenth obtaining sub-module is used to process the sample fusion data based on a first single mutation processing strategy to obtain the sample multi-mutation detection result.

According to embodiments of the present disclosure, the sixth obtaining module 730 may include a seventeenth obtaining sub-module, an eighteenth obtaining sub-module, and a nineteenth obtaining sub-module.

The seventeenth obtaining sub-module is used to process the sample fusion data based on a second single mutation processing strategy to obtain intermediate sample feature data.

The eighteenth obtaining sub-module is used to process the intermediate sample feature data based on each of a plurality of second mutation processing strategies, so as to obtain a plurality of sample mutation detection results respectively corresponding to the plurality of second mutation processing strategies.

The nineteenth obtaining sub-module is used to obtain the sample multi-mutation detection result according to the plurality of sample mutation detection results respectively corresponding to the plurality of second mutation processing strategies.

According to embodiments of the present disclosure, the fourth obtaining module 710 may include a twentieth obtaining sub-module and a twenty-first obtaining sub-module.

The twentieth obtaining sub-module is used to obtain sample image feature data in at least one scale according to the sample medical image of the sample part.

The twenty-first obtaining sub-module is used to obtain the sample image segmentation result according to the sample image feature data in at least one scale.

Any number of the modules, sub-modules and units according to embodiments of the present disclosure, or at least part of functions of any number of them may be implemented in one module. Any one or more of the modules, sub-modules and units according to embodiments of the present disclosure may be split into a plurality of modules for implementation. Any one or more of the modules, sub-modules and units according to embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable manner of integrating or encapsulating the circuit, or may be implemented by any one of three implementation modes of software, hardware and firmware or an appropriate combination thereof. Alternatively, one or more of the modules, sub-modules and units according to embodiments of the present disclosure may be at least partially implemented as a computer program module that, when executed, performs the corresponding functions.

For example, any number of the first obtaining module 610, the second obtaining module 620 and the third obtaining module 630, or any number of the fourth obtaining module 710, the fifth obtaining module 720, the sixth obtaining module 730 and the training module 740 may be combined into one module/sub-module/unit for implementation, or any one of the modules/sub-modules/units may be divided into a plurality of modules/sub-modules/units. Alternatively, at least part of the functions of one or more of these modules/sub-modules/units may be combined with at least part of the functions of other modules/sub-modules/units and implemented in one module/sub-module/unit. According to embodiments of the present disclosure, at least one of the first obtaining module 610, the second obtaining module 620 and the third obtaining module 630, or at least one of the fourth obtaining module 710, the fifth obtaining module 720, the sixth obtaining module 730 and the training module 740 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable manner of integrating or encapsulating the circuit, or may be implemented by any one of the three implementation modes of software, hardware and firmware or an appropriate combination thereof. Alternatively, at least one of the first obtaining module 610, the second obtaining module 620 and the third obtaining module 630, or at least one of the fourth obtaining module 710, the fifth obtaining module 720, the sixth obtaining module 730 and the training module 740 may be at least partially implemented as a computer program module that may perform corresponding functions when executed.

It should be noted that a part for the apparatus and the apparatus of training the deep learning model in embodiments of the present disclosure corresponds to a part for the computer-implemented method and the method of training the deep learning model in embodiments of the present disclosure. For the descriptions of the apparatus and the apparatus of training the deep learning model, reference may be made to the computer-implemented method and the method of training the deep learning model, and details will not be repeated here.

Figure 8:
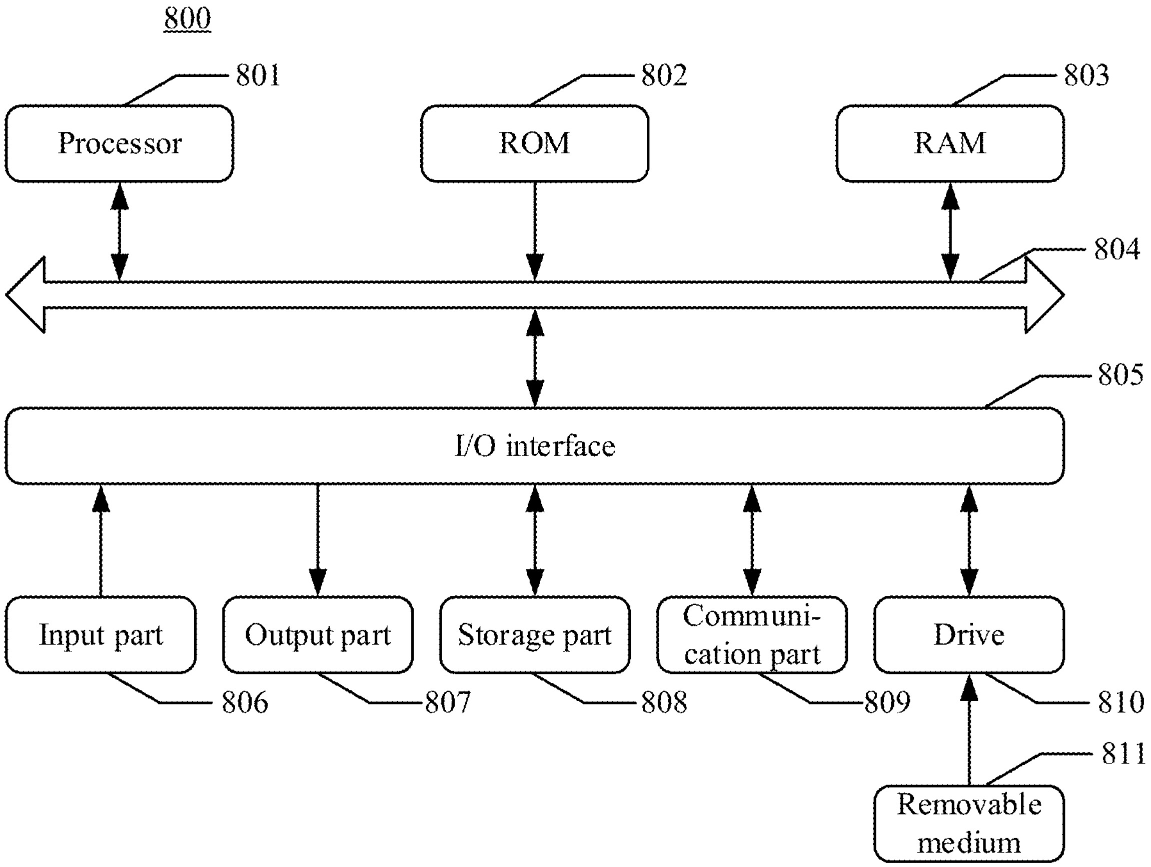
FIG. 8 schematically shows a block diagram of an electronic device suitable for implementing the computer-implemented method and the method of training the deep learning model according to embodiments of the present disclosure.

FIG. 8 schematically shows a block diagram of an electronic device suitable for implementing the computer-implemented method and the method of training the deep learning model according to embodiments of the present disclosure. The electronic device shown in FIG. 8 is merely an example, and should not bring any limitation to functions and scopes of use of embodiments of the present disclosure.

As shown in FIG. 8, an electronic device 800 according to embodiments of the present disclosure includes a processor 801, which may execute various appropriate actions and processing according to the program stored in a read only memory (ROM) 802 or the program loaded into a random access memory (RAM) 803 from a storage part 808. The processor 801 may, for example, include a general-purpose microprocessor (for example, CPU), an instruction set processor and/or a related chipset and/or a special-purpose microprocessor (for example, an application specific integrated circuit (ASIC)), and the like. The processor 801 may further include an on-board memory for caching purposes.

The processor 801 may include a single processing unit or multiple processing units for executing different actions of the method flow according to embodiments of the present disclosure.

Various programs and data required for the operation of the device 800 are stored in the RAM 803. The processor 801, the ROM 802 and the RAM 803 are connected to each other through a bus 804. The processor 801 executes various operations of the method flow according to embodiments of the present disclosure by executing the programs in the ROM 802 and/or the RAM 803. It should be noted that the program may also be stored in one or more memories other than the ROM 802 and the RAM 803. The processor 801 may also execute various operations of the method flow according to embodiments of the present disclosure by executing the programs stored in the one or more memories.

According to embodiments of the present disclosure, the electronic device 800 may further include an input/output (I/O) interface 805 which is also connected to the bus 804. The device 800 may further include one or more of the following components connected to the I/O interface 805: an input part 806 including a keyboard, a mouse, etc.; an output part 807 including a cathode ray tube (CRT), a liquid crystal display (LCD), etc. and a speaker, etc.; a storage part 808 including a hard disk, etc.; and a communication part 809 including a network interface card such as a LAN card, a modem, and the like. The communication part 809 performs communication processing via a network such as the Internet. A drive 810 is also connected to the I/O interface 805 as required. A removable medium 811, such as a magnetic disk, an optical disk, a magneto-optical disk, a semiconductor memory, and the like, is installed on the drive 810 as required, so that the computer program read therefrom is installed into the storage part 808 as needed.

The method flow according to embodiments of the present disclosure may be implemented as a computer software program. For example, embodiments of the present disclosure include a computer program product including a computer program carried on a computer-readable storage medium. The computer program includes a program code for execution of the method shown in the flowchart. In such embodiments, the computer program may be downloaded and installed from the network through the communication part 809, and/or installed from the removable medium 811. When the computer program is executed by the processor 801, the above-mentioned functions defined in the system of embodiments of the present disclosure are performed. According to embodiments of the present disclosure, the above-described systems, apparatuses, devices, modules, units, etc. may be implemented by computer program modules.

The present disclosure further provides a computer-readable storage medium, which may be included in the apparatus/device/system described in the above embodiments; or exist alone without being assembled into the apparatus/device/system. The above-mentioned computer-readable storage medium carries one or more programs that when executed, perform the methods according to embodiments of the present disclosure.

According to embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device.

For example, according to embodiments of the present disclosure, the computer-readable storage medium may include the above-mentioned ROM 802 and/or RAM 803 and/or one or more memories other than the ROM 802 and RAM 803.

Embodiments of the present disclosure further include a computer program product, which contains a computer program. The computer program contains program code for performing the method provided by the embodiments of the present disclosure. When the computer program product runs on an electronic device, the program code causes the electronic device to implement the computer-implemented method of and the method of training the deep learning model provided in embodiments of the present disclosure.

When the computer program is executed by the processor 801, the above-mentioned functions defined in the system/apparatus of the embodiments of the present disclosure are performed. According to the embodiments of the present disclosure, the above-described systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 809, and/or installed from the removable medium 811. The program code contained in the computer program may be transmitted by any suitable medium, including but not limited to a wireless one, a wired one, or any suitable combination of the above.

According to the embodiments of the present disclosure, the program code for executing the computer programs provided by the embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing device, partially executed on the user device, partially executed on the remote computing device, or completely executed on the remote computing device or server. In a case of involving a remote computing device, the remote computing device may be connected to a user computing device through any kind of network, including a local area network (LAN) or a wide area networks (WAN), or may be connected to an external computing device (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions. Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

Embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A computer-implemented method, comprising:

obtaining a target image segmentation result according to a target medical image of a target part, wherein the target medical image comprises a medical image in at least one modality;

obtaining target fusion data according to the target medical image segmentation result and a medical image in a predetermined modality in the target medical image; and obtaining a target multi-mutation detection result according to the target fusion data, wherein the obtaining a target image segmentation result according to a target medical image of a target part comprises:

obtaining target image feature data in at least one scale according to the target medical image of the target part; and obtaining the target image segmentation result according to the target image feature data in at least one scale, wherein the at least one scale comprises J scales, and J is an integer greater than or equal to 1; and wherein the obtaining the target image segmentation result according to the target image feature data in at least one scale comprises:

for 1≤j<J, obtaining jth-scale fusion image feature data according to jth-scale target image feature data and jth-scale up-sampling image feature data, wherein the jth-scale up-sampling image feature data is obtained according to (j+1)th-scale target image feature data and (j+1)th-scale up-sampling image feature data, the jth-scale target image feature data is obtained according to (j−1)th-scale target image feature data, and j is an integer greater than or equal to 1 and less than or equal to J; and obtaining the target image segmentation result according to 1st-scale fusion image feature data.

2. The method according to claim 1, wherein the target medical image comprises a target multi-modal medical image, and the target multi-modal medical image comprises a medical image in a plurality of modalities; and wherein the obtaining target fusion data according to the target medical image segmentation result and a medical image in a predetermined modality in the target medical image comprises:

obtaining first target tumor region feature data according to the target image segmentation result and a medical image in a first predetermined modality in the target multi-modal medical image; and obtaining the target fusion data according to the first target tumor region feature data and a medical image in a second predetermined modality in the target multi-modal medical image.

3. The method according to claim 1, wherein the target medical image comprises a target mono-modal medical image, and the target mono-modal medical image comprises a medical image in a single modality; and wherein the obtaining target fusion data according to the target medical image segmentation result and a medical image in a predetermined modality in the target medical image comprises:

obtaining second target tumor region feature data according to the target image segmentation result and the target mono-modal medical image; and determining the second target tumor region feature data as the target fusion data.

4. The method according to claim 1, wherein the obtaining a target multi-mutation detection result according to the target fusion data comprises:

processing the target fusion data based on each of a plurality of first mutation processing strategies, so as to obtain a plurality of target mutation detection results respectively corresponding to the plurality of first mutation processing strategies; and obtaining the target multi-mutation detection result according to the plurality of target mutation detection results respectively corresponding to the plurality of first mutation processing strategies.

5. The method according to claim 1, wherein the obtaining a target multi-mutation detection result according to the target fusion data comprises:

processing the target fusion data based on a first single mutation processing strategy to obtain the target multi-mutation detection result.

6. The method according to claim 1, wherein the obtaining a target multi-mutation detection result according to the target fusion data comprises:

processing the target fusion data based on a second single mutation processing strategy to obtain intermediate feature data;

processing the intermediate feature data based on each of a plurality of second mutation processing strategies, so as to obtain a plurality of target mutation detection results respectively corresponding to the plurality of second mutation processing strategies; and obtaining the target multi-mutation detection result according to the plurality of target mutation detection results respectively corresponding to the plurality of second mutation processing strategies.

7. The method according to claim 1, wherein the target part comprises a brain, and the target multi-mutation detection result comprises at least two selected from: a target isocitrate dehydrogenase mutation detection result, a target chromosome 1p/19q co-deletion mutation detection result, a target telomerase reverse tranase mutation detection result, or a target $O^6$-methylguanine-DNA methyltransferase promoter methylation mutation detection result.

8. A method of training a deep learning model, comprising:

obtaining a sample image segmentation result according to a sample medical image of a sample part, wherein the sample medical image comprises a medical image in at least one modality;

obtaining sample fusion data according to the sample image segmentation result and a medical image in a predetermined modality in the sample multi-modal medical image;

obtaining a sample multi-mutation detection result according to the sample fusion data; and training the deep learning model by using the sample image segmentation result, a sample image segmentation label of the sample medical image, the sample multi-mutation detection result, and a sample multi-mutation label of the sample medical image, wherein the obtaining a sample image segmentation result according to a sample medical image of a sample part comprises:

obtaining sample image feature data in at least one scale according to the sample medical image of the sample part; and obtaining the sample image segmentation result according to the sample image feature data in at least one scale, wherein the at least one scale comprises J scales, and J is an integer greater than or equal to 1; and wherein the obtaining the sample image segmentation result according to the sample image feature data in at least one scale comprises:

for $1 \leq j < J$, obtaining jth-scale fusion image feature data according to jth-scale sample image feature data and jth-scale up-sampling image feature data, wherein the jth-scale up-sampling image feature data is obtained according to (j+1)th-scale sample image feature data and (j+1)th-scale up-sampling image feature data, the jth-scale sample image feature data is obtained according to (j−1)th-scale sample image feature data, and j is an integer greater than or equal to 1 and less than or equal to J; and obtaining the sample image segmentation result according to 1st-scale fusion image feature data.

9. The method according to claim 8, wherein the training the deep learning model by using the sample image segmentation result, a sample image segmentation label of the sample medical image, the sample multi-mutation detection result, and a sample multi-mutation label of the sample medical image comprises:

obtaining a first output value based on a first loss function according to the sample image segmentation result and the sample image segmentation label of the sample medical image;

obtaining a second output value based on a second loss function according to the sample multi-mutation detection result and the sample multi-mutation label of the sample medical image; and adjusting a model parameter of the deep learning model according to an output value, wherein the output value is determined according to the first output value and the second output value.

10. The method according to claim 9, wherein the obtaining a sample multi-mutation detection result according to the sample fusion data comprises:

processing the sample fusion data based on each of a plurality of first mutation processing strategies, so as to obtain a plurality of sample mutation detection results respectively corresponding to the plurality of first mutation processing strategies; and obtaining the sample multi-mutation detection result according to the plurality of sample mutation detection results respectively corresponding to the plurality of first mutation processing strategies.

11. The method according to claim 1, wherein the output value is determined according to the first output value, the second output value, and a third output value; and wherein the method further comprises:

obtaining the third output value based on a third loss function according to a sample mutation detection result corresponding to a predetermined mutation processing strategy and a sample mutation label.

12. The method according to claim 8, wherein the obtaining a sample multi-mutation detection result according to the sample fusion data comprises:

processing the sample fusion data based on a first single mutation processing strategy to obtain the sample multi-mutation detection result.

13. The method according to claim 8, wherein the obtaining a sample multi-mutation detection result according to the sample fusion data comprises:

processing the sample fusion data based on a second single mutation processing strategy to obtain intermediate sample feature data;

processing the intermediate sample feature data based on each of a plurality of second mutation processing strategies, so as to obtain a plurality of sample mutation detection results respectively corresponding to the plurality of second mutation processing strategies; and obtaining the sample multi-mutation detection result according to the plurality of sample mutation detection results respectively corresponding to the plurality of second mutation processing strategies.

14. An electronic device, comprising: one or more processors; and a non-transitory memory for storing one or more programs wherein the one or more programs are configured to, when executed by the one or more processors, cause the one or more processors to implement the method of claim 1.

15. A computer readable storage medium having executable instructions therein, wherein the instructions are configured to, when executed by a processor, cause the processor to implement the method of claim 1.

16. An electronic device, comprising: one or more processors; and a non-transitory memory for storing one or more programs, wherein the one or more programs are configured to, when executed by the one or more processors, cause the one or more processors to implement the method of claim 8.

17. A computer readable storage medium having executable instructions therein, wherein the instructions are configured to, when executed by a processor, cause the processor to implement the method of claim 8.

18. A computer-implemented method, comprising:

obtaining a target image segmentation result according to a target medical image of a target part, wherein the target medical image comprises a medical image in at least one modality;

obtaining target fusion data according to the target medical image segmentation result and a medical image in a predetermined modality in the target medical image; and obtaining a target multi-mutation detection result according to the target fusion data, wherein the obtaining a target image segmentation result according to a target medical image of a target part comprises:

obtaining target image feature data in at least one scale according to the target medical image of the target part; and obtaining the target image segmentation result according to the target image feature data in at least one scale, wherein the at least one scale comprises K scales, and K is an integer greater than or equal to 1; and wherein the obtaining the target image segmentation result according to the target image feature data in at least one scale comprises:

for 1≤k<K, obtaining kth-scale fusion image feature data according to kth-scale target image feature data, (k−1)th-scale target image feature data, (k+1)th-scale target image feature data, and kth-scale up-sampling image feature data, wherein the kth-scale up-sampling image feature data is obtained according to the (k+1)th-scale target image feature data, the kth-scale target image feature data, (k+2)th-scale target image feature data and (k+1)th-scale up-sampling image feature data, the kth-scale target image feature data is obtained according to the (k−1)th-scale target image feature data, and k is an integer greater than or equal to 1 and less than or equal to K; and obtaining the target image segmentation result according to 1st-scale fusion image feature data.

19. An electronic device, comprising: one or more processors; and a non-transitory memory for storing one or more programs, wherein the one or more programs are configured to, when executed by the one or more processors, cause the one or more processors to implement the method of claim 18.

20. A computer readable storage medium having executable instructions therein, wherein the instructions are configured to, when executed by a processor, cause the processor to implement the method of claim 18.

* * * * *